(12) United States Patent
Montorsi et al.

(10) Patent No.: US 10,219,177 B2
(45) Date of Patent: Feb. 26, 2019

(54) WIRELESS LOCAL AREA NETWORK TRANSMISSION METHOD AND TRANSMISSION DEVICE

(71) Applicant: HUAWEI TECHNOLOGIES CO., LTD., Shenzhen, Guangdong (CN)

(72) Inventors: Guido Montorsi, Turin (IT); Sergio Benedetto, Turin (IT); Jian Yu, Shenzhen (CN); Jun Zhu, Shanghai (CN); Wei Lin, Shenzhen (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 1 day.

(21) Appl. No.: 15/411,019

(22) Filed: Jan. 20, 2017

(65) Prior Publication Data

US 2017/0134983 A1 May 11, 2017

Related U.S. Application Data

(63) Continuation of application No. PCT/CN2014/082827, filed on Jul. 23, 2014.

(51) Int. Cl.
*H04W 28/06* (2009.01)
*H04W 4/06* (2009.01)
(Continued)

(52) U.S. Cl.
CPC ....... *H04W 28/065* (2013.01); *H04L 27/2613* (2013.01); *H04L 27/2663* (2013.01);
(Continued)

(58) Field of Classification Search
None
See application file for complete search history.

(56) References Cited

U.S. PATENT DOCUMENTS

| 7,920,599 B1 | 4/2011 | Subramanian et al. |
| 2008/0101451 A1* | 5/2008 | Wang ............... H04L 5/0007 375/232 |

(Continued)

FOREIGN PATENT DOCUMENTS

| CN | 101175058 A | 5/2008 |
| CN | 101888360 A | 11/2010 |

(Continued)

OTHER PUBLICATIONS

Chinese Office Action dated Aug. 17, 2018 in corresponding Chinese Patent Application No. 201480043544.4, 6 pgs.
(Continued)

*Primary Examiner* — Eunsook Choi
(74) *Attorney, Agent, or Firm* — Staas & Halsey

(57) ABSTRACT

A method includes: generating a packet, where first L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$; and sending the packet to a receive end, so that the receive end receives and parses the packet.

16 Claims, 15 Drawing Sheets

(51) Int. Cl.

| | |
|---|---|
| *H04L 27/26* | (2006.01) |
| *H04L 29/06* | (2006.01) |
| *H04W 84/12* | (2009.01) |
| *H04L 5/00* | (2006.01) |
| *H04L 27/18* | (2006.01) |

(52) U.S. Cl.
CPC ........... *H04L 27/2666* (2013.01); *H04W 4/06* (2013.01); *H04L 5/003* (2013.01); *H04L 27/18* (2013.01); *H04L 69/22* (2013.01); *H04W 84/12* (2013.01); *Y02D 70/142* (2018.01)

(56) References Cited

U.S. PATENT DOCUMENTS

| | | | | |
|---|---|---|---|---|
| 2008/0232238 | A1* | 9/2008 | Agee | H04B 7/0413 370/208 |
| 2009/0046790 | A1* | 2/2009 | Soliman | H04B 1/0067 375/260 |
| 2012/0170563 | A1* | 7/2012 | Abraham | H04L 27/2607 370/338 |
| 2012/0207140 | A1 | 8/2012 | Yu et al. | |
| 2012/0314570 | A1* | 12/2012 | Forenza | H04B 7/024 370/230 |
| 2015/0117433 | A1* | 4/2015 | Zhang | H04L 69/22 370/338 |
| 2015/0334708 | A1* | 11/2015 | Lee | H04L 1/00 370/329 |
| 2016/0080056 | A1* | 3/2016 | Porat | H04L 5/0048 370/329 |
| 2016/0156750 | A1* | 6/2016 | Zhang | H04L 69/22 370/338 |
| 2017/0201906 | A1* | 7/2017 | Liu | H04L 27/2607 |

FOREIGN PATENT DOCUMENTS

| | | |
|---|---|---|
| CN | 102255836 A | 11/2011 |
| CN | 102695193 A | 9/2012 |
| CN | 102939724 A | 2/2013 |
| CN | 103299693 A | 9/2013 |
| CN | 103299693 B | 7/2016 |

OTHER PUBLICATIONS

International Search Report, dated Apr. 28, 2015, in International Application No. PCT/CN2014/082827 (4 pp.)
International Search Report dated Apr. 28, 2015 in corresponding to International Patent Application No. PCT/CN2014/082827.
Extended European Search Report dated Jun. 14, 2017 in corresponding European Patent Application No. 14897916.4.
"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancement for Very High Throughput for Operation in Bands below 6 GHz," IEEE p. 802.11ac™/ D3.0, Jun. 2012.
"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancement for Higher Throughput," IEEE Std 802.11n™—2009, IEEE Computer Society, Oct. 29, 2009.
"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancement for Very High Throughput for Operation in Bands below 6 GHz," IEEE Std 802.11ac™—2013, IEEE Computer Society, Dec. 11, 2013.
Simone Merlin et al. "TGax Simulation Scenarios," IEE 802.11ac™—14/0621r32, May 13, 2014.
Osama Aboul-Magd et al. "802.11 HEW SG Proposed PAR," IEE 802.11ac™—12/1077r0, Sep. 2014.

\* cited by examiner

WIRELESS LOCAL AREA NETWORK TRANSMISSION METHOD AND TRANSMISSION DEVICE

CROSS-REFERENCE TO RELATED APPLICATIONS

This application is a continuation of International Application No. PCT/CN2014/082827, filed on Jul. 23, 2014, the disclosure of which is hereby incorporated by reference in its entirety.

TECHNICAL FIELD

The present disclosure relates to the communications field, and more specifically, to a wireless local area network transmission method and transmission device.

BACKGROUND

In a wireless local area network (WLAN) standard of an 802.11ax (11ax for short) version, an indoor scenario and an outdoor scenario are considered.

In comparison with the indoor scenario, a long distance in the outdoor scenario generates a longer delay spread, which results in severe inter-symbol interference (ISI). To reduce ISI impact, a longer cyclic prefix (CP) is considered and applied to a data section of a transmitted packet structure. In addition, to reduce overheads of the CP, an FFT with a larger quantity of points is used in the data section, that is, a longer symbol period. Using the longer cyclic prefix can reduce inter-symbol interference of a data field section, thereby improving transmission performance.

However, for a signal field, even though a most robust binary phase shift keying (BPSK) modulation method, a lowest ½ bit rate, and a CP length (0.8 μs) in the existing 802.11a/g/n/ac standards are used, a PER requirement for the signal field (1% or lower is required) still cannot be met due to the ISI impact. Therefore, for the outdoor scenario, a more robust signal field needs to be designed.

A signal field in a WLAN system generally includes two parts: a legacy signal field (L-SIG) with a need to consider backward compatibility and a signal field for identifying a new feature, for example, a high throughput signal field (HT-SIG) in 802.11n (11n for short) or a very high throughput signal field (VHT-SIG) in 802.11ac (11ac for short). Similarly, a signal field for identifying a new feature in 11ax is named as a high efficient signal field (HE-SIG).

How to ensure both robustness of packet transmission in an outdoor scenario and backward compatibility is a technical problem that needs to be resolved in the present invention.

SUMMARY

Embodiments of the present invention provide a wireless local area network transmission method and transmission device, which can not only ensure backward compatibility, but also strengthen robustness of transmission in an outdoor scenario to an extent.

According to a first aspect, a wireless local area network transmission method is proposed, where the method includes: generating a packet, where first L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$; and sending the packet to a receive end, so that the receive end receives and parses the packet.

According to a second aspect, a wireless local area network transmission method is proposed, where the method includes: generating a packet, where a time domain sequence of a second symbol in the packet includes a first time domain sequence part and a second time domain sequence part, a first symbol in the packet includes a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, where $N+L=80$ and $1 \leq N \leq L$; and sending the packet to a receive end, so that the receive end receives and parses the packet.

According to a third aspect, a wireless local area network transmission method is proposed, where the method includes: receiving a packet sent by a wireless local area network transmit end; acquiring an autocorrelation value of a specified time domain sequence part of a first symbol and a specified time domain sequence part of a second symbol in the packet, where the specified time domain sequence part of the first symbol is all or a part of a time domain sequence of an information bearing section in the first symbol, the first symbol includes a cyclic prefix CP and the information bearing section, and the second symbol is a symbol following the first symbol, where a length of the CP is 16 bits, and a length of the information bearing section is 64 bits; and determining, when the autocorrelation value is greater than a predetermined threshold, to parse the packet by using a signaling format of a first scenario; or determining, when the autocorrelation value is less than a predetermined threshold, to parse the packet by using a signaling format of a second scenario.

According to a fourth aspect, a wireless local area network transmission device is proposed, where the device includes: a generation unit, configured to generate a packet, where first L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$; and a sending unit, configured to send the packet to a receive end, so that the receive end receives and parses the packet.

According to a fifth aspect, a wireless local area network transmission device is proposed, where the device includes: a generation unit, configured to generate a packet, where a time domain sequence of a second symbol in the packet includes a first time domain sequence part and a second time domain sequence part, and a first symbol in the packet includes a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, where N+L=80 and 1≤N≤L; and a sending unit, configured to send the packet to a receive end, so that the receive end receives and parses the packet.

According to a sixth aspect, a wireless local area network transmission device is proposed, where the device includes: a receiving unit, configured to receive a packet sent by a wireless local area network transmit end; an acquiring unit, configured to acquire an autocorrelation value of a specified time domain sequence part of a first symbol and a specified time domain sequence part of a second symbol in the packet, where the specified time domain sequence part of the first symbol is all or a part of a time domain sequence of an information bearing section in the first symbol, the first symbol includes a cyclic prefix CP and the information bearing section, and the second symbol is a symbol following the first symbol, where a length of the CP is 16 bits, and a length of the information bearing section is 64 bits; and a parsing unit, configured to determine, when the autocorrelation value is greater than a predetermined threshold, to parse the packet by using a signaling format of a first scenario; or determine, when the autocorrelation value is less than a predetermined threshold, to parse the packet by using a signaling format of a second scenario.

According to the wireless local area network transmission method and transmission device of the embodiments of the present invention, a postfix of an information bearing section of a current symbol is added after the current symbol, which can not only ensure backward compatibility, but also strengthen robustness of transmission in an outdoor scenario to an extent.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
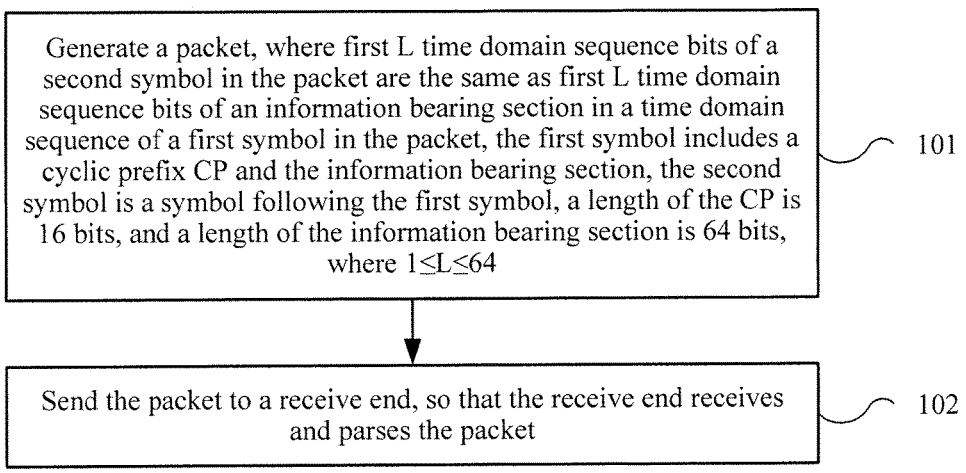
FIG. 1 is a flowchart of a transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention.

The technical solutions of the present invention may be applied to an orthogonal frequency division multiplexing (OFDM) technology system, for example, a wireless local area network (WLAN) system, especially Wireless Fidelity (Wifi) or the like. Certainly, the method in the embodiments of the present invention may be further applied to another type of OFDM system, which is not limited in the embodiments of the present invention.

For ease of understanding the embodiments of the present invention, several elements that are introduced in describing the embodiments of the present invention are described herein first.

The orthogonal frequency division multiplexing (OFDM) technology is a kind of multi-carrier modulation (MCM).

One major advantage of the OFDM system is that an orthogonal subcarrier may implement modulation and demodulation by means of fast Fourier transform (FFT/IFFT). For an N-point IFFT operation, N^2 complex multiplication operations need to be performed. However, by using a common IFFT algorithm on the basis of 2, the complex multiplication is only (N/2) log 2N, which may remarkably reduce operation complexity. In an OFDM propagation process, after a serial-to-parallel conversion, a high-speed information data stream is allocated to transmit on several low-rate sub-channels, and a symbol period on each sub-channel is relatively increased, which may reduce inter-symbol interference with a system due to time dispersion generated by a multi-path delay spread on a wireless channel. In addition, because a guard interval is introduced, in a case in which the guard interval is greater than a maximum multi-path delay spread, inter-symbol interference brought by a multi-path may be eliminated to a maximum extent. If a cyclic prefix is used as the guard interval, inter-channel interference brought by the multi-path may further be avoided.

A wireless access point (AP) is a wireless switch for a wireless network, and is also a core of the wireless network. The wireless AP is an access point for a mobile computer user to access a wired network, and is mainly used for a broadband home, a building interior, and a park interior. A typical distance covers tens of meters to hundreds of meters. Currently, a major technology is an 802.11 series. The AP is equal to a bridge that connects the wired network and the wireless network. A main function of the AP is to connect all wireless network clients together, and then connect the wireless network to Ethernet.

A station (STA) is any wireless terminal device such as a computer with a wireless network interface card or a smart phone with a WiFi module.

An additive noise is a noise superposed on a signal, and is generally recorded as n(t). Whether there is a signal, the noise n(t) always exists and is generally referred to as the additive noise or additive interference.

A white noise is a noise whose power spectrum density is a constant at all frequencies. If a probability distribution of a white noise value is consistent with a Gaussian distribution, such a noise is referred to as a white Gaussian noise.

An additive white Gaussian noise (AWGN) is a most basic noise and interference model. An amplitude distribution of the additive white Gaussian noise is consistent with a Gaussian distribution, and a power spectrum density of the additive white Gaussian noise is evenly distributed. That is, except the additive white Gaussian noise, r(t) and s(t) have no distortion.

An AWGN channel is an ideal channel whose noise distribution follows a distribution of the additive white Gaussian noise.

Non line of sight indicates that a line of sight is blocked between two points for communication, the two points are incapable of seeing each other, and more than 50% of a Fresnel region is blocked.

An urban microcell non line of sight (UMi NLOS) channel is a channel on the basis of non line of sight transmission in an urban microcell.

FIG. 1 is a flowchart of a transmission method according to an embodiment of the present invention. The method in FIG. 1 is executed by a wireless local area network transmit end. In a specific application, the transmit end may be an AP or a STA in a WLAN system.

101. Generate a packet.

First L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$.

It should be understood that, the first L time domain sequence bits of the second symbol in the packet are the same as the first L time domain sequence bits of the information bearing section in the time domain sequence of the first symbol in the packet, that is, the first L time domain sequence bits of the second symbol in the packet is a copy of the first L time domain sequence bits of the information bearing section in the time domain sequence of the first symbol in the packet. A case mentioned elsewhere that time domain sequences are the same in the present invention has a similar meaning to the meaning herein.

It should be understood that, an information bearing section carries actual content of a symbol. For example, a symbol in which an L-SIG is located includes a CP section and an L-SIG field section, where the L-SIG field section is the information bearing section.

It should be understood that, in this embodiment of the present invention, the first symbol and the second symbol are only used to distinguish different symbols, and do not represent a symbol order in the packet. A first symbol and a second symbol mentioned in the following are similar.

102. Send the packet to a receive end, so that the receive end receives and parses the packet.

It should be understood that, in this embodiment of the present invention, the receive end refers to a receive end device that is in a same WLAN network as the transmit end, and may be an AP or a STA. When the transmit end is an AP, the receive end is a STA, or when the transmit end is a STA, the receive end is an AP.

In this embodiment of the present invention, a cyclic postfix of an information bearing section of a first symbol is added after the first symbol of a packet of an outdoor scenario, which can not only ensure backward compatibility, but also strengthen robustness of packet transmission to an extent by reducing ISI impact.

In addition, according to the method in this embodiment of the present invention, an 11ax receive end (11ax AP or 11ax STA) can further determine, according to an autocorrelation value of specified time domain sequence parts of two symbols that are the first symbol and a symbol following the first symbol, whether the packet is a packet of an outdoor scenario, and then, can parse and read the packet according to packet formats of different scenarios.

It should be understood that, because a transmission distance in an outdoor scenario is longer than a transmission distance in an indoor scenario, a longer delay spread may be generated, thereby resulting in severe ISI. According to the method in this embodiment of the present invention, not only the backward compatibility may be ensured, but also robustness of packet transmission in the outdoor scenario is strengthened. In addition, it should be understood that, the outdoor scenario is only a preferred implementation scenario of this embodiment of the present invention, and the method in this embodiment of the present invention may also be applied to an environment of an indoor scenario. In the present invention, the packet of the outdoor scenario only indicates that the packet is generally used in the outdoor scenario, and does not indicate that the packet of the outdoor scenario can be transmitted only in the outdoor scenario.

Similarly, a packet of the indoor scenario only indicates that the packet is generally used in the indoor scenario, and does not indicate that the packet of the indoor scenario can be transmitted only in the indoor scenario. In a practical application, the packet of the indoor scenario, the packet of the outdoor scenario, and even a WLAN packet of a different version may be simultaneously transmitted at a specific place.

Optionally, the first symbol is a symbol in which legacy signaling L-SIG is located. In this embodiment of the present invention, a cyclic postfix for an L-SIG is added after a symbol in which the L-SIG is located in a packet of an outdoor scenario, which can not only ensure backward compatibility for parsing the L-SIG, but also reduce ISI impact, thereby strengthening robustness for the packet to transmit the L-SIG.

Preferably, a value of L is 16, 24, 36 or 48.

Figure 2:
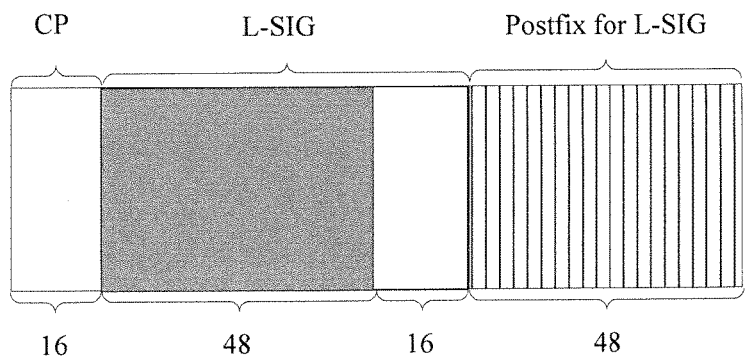
FIG. 2 is a schematic diagram of a format of a symbol in which an L-SIG is located and a symbol in which a postfix for the L-SIG is located according to an embodiment of the present invention.

FIG. 2 is a schematic diagram of a format of a symbol in which an L-SIG is located and a symbol in which a postfix for the L-SIG is located according to an embodiment of the present invention. In this embodiment of the present invention, a manner of a preferred data format of the legacy signaling L-SIG and the postfix for the L-SIG is shown in FIG. 2, including: a 16-bit CP, a 64-bit L-SIG, and a 48-bit postfix for the L-SIG (Postfix for L-SIG). A time domain sequence of the postfix for the L-SIG (a shaded section with vertical bars in FIG. 2) is the same as first 48 time domain sequence bits (a grey area section in FIG. 2) of the 64-bit L-SIG. It should be understood that, a length of a cyclic postfix needs to be greater than a delay spread of a channel minus a length 16 (corresponding to a time of 0.8 µs) of a current CP, that is, the delay spread of the channel needs to be less than the length of the cyclic postfix plus 16. When a value of a cyclic postfix for the L-SIG is 48, time occupied by the cyclic postfix for the L-SIG is corresponding to a time of 2.4 µs. Therefore, when the delay spread of the channel is less than 3.2 µs, a 48-point cyclic postfix may meet a requirement of resisting ISI impact. That is, a minimum length of the cyclic postfix depends on the delay spread of the channel. If the delay spread of the channel is 0, a minimum value of a length L of the cyclic postfix may be 1. In addition, a maximum length of the cyclic postfix cannot exceed a length of the L-SIG, and a maximum value of L may be 64. Therefore, $1 \leq L \leq 64$.

Figure 3:
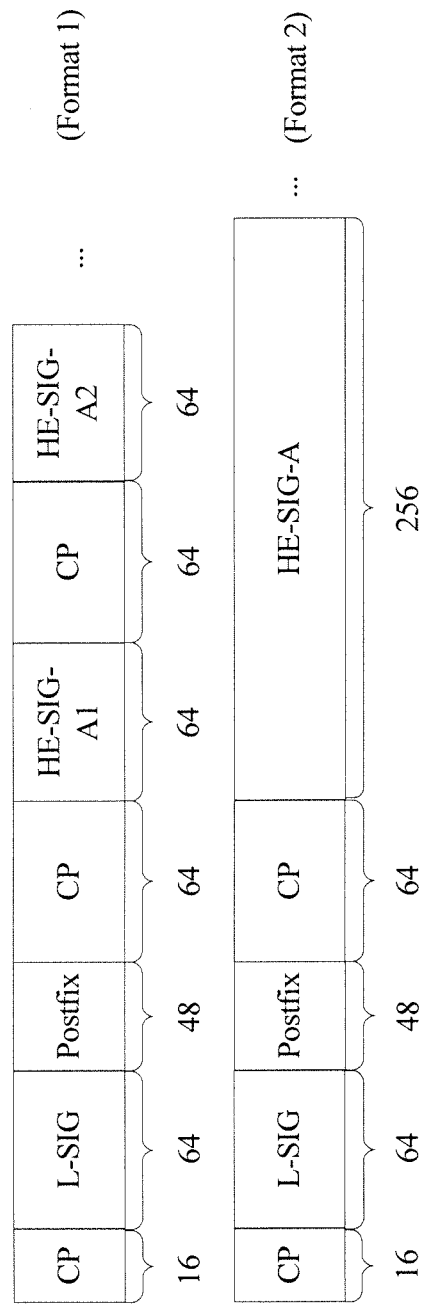
FIG. 3 is a schematic diagram of a format of a symbol in which an L-SIG is located, a symbol in which a postfix for the L-SIG is located, and a symbol in which an HE-SIG is located in an outdoor scenario according to an embodiment of the present invention.

FIG. 3 is a schematic diagram of a format of a symbol in which an L-SIG is located, a symbol in which a postfix for the L-SIG is located, and a symbol in which an HE-SIG is located in an outdoor scenario according to an embodiment of the present invention. In this embodiment of the present invention, a signaling format of the symbol in which the L-SIG is located, the symbol in which the postfix for the L-SIG is located and the symbol in which the HE-SIG is located in a packet of the outdoor scenario may be shown as format 1 in FIG. 3, including: 16-bit CP+64-bit L-SIG+48-bit postfix (Postfix)+several (16-bit CP+64-bit HE-SIG), or may be shown as format 2 in FIG. 3, including: 16-bit CP+64-bit L-SIG+48-bit postfix (Postfix)+several (64-bit CP+256-bit HE-SIG). It should be understood that, the signaling format in FIG. 3 is only a preferred solution. In a practical application, another signaling format may be used in the method in this embodiment of the present invention, for example, a length of the postfix is 16, 24, 32, or the like.

Figure 4:
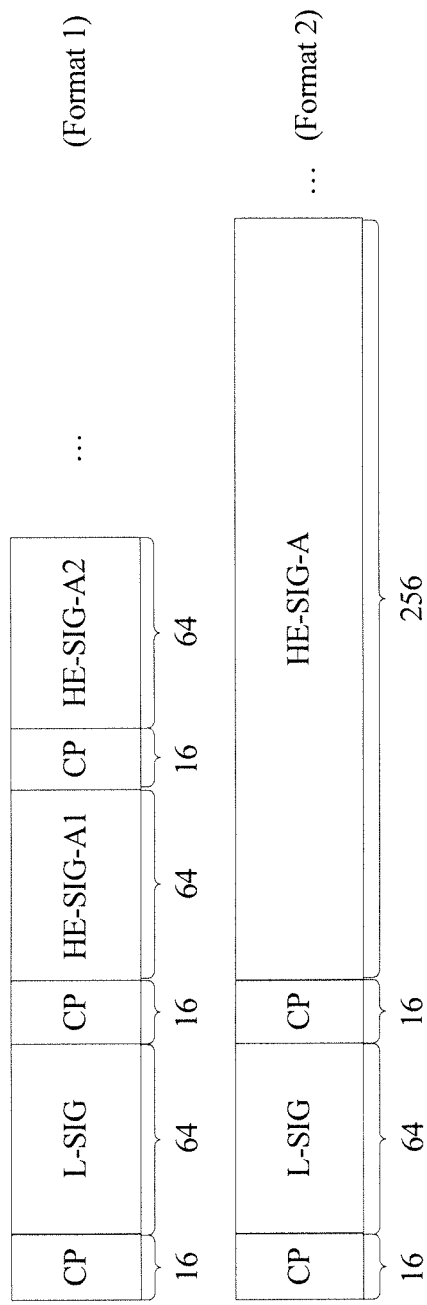
FIG. 4 is a schematic diagram of a format of a symbol in which an L-SIG is located and a symbol in which an HE-SIG is located in an indoor scenario according to an embodiment of the present invention.

In addition, a wireless local area network transmit end in this embodiment of the present invention may further send a packet of an indoor scenario. FIG. 4 is a schematic diagram of a format of a symbol in which an L-SIG is located and a symbol in which an HE-SIG is located in an indoor scenario according to an embodiment of the present invention. In this case, a signaling format of the symbol in which the L-SIG is located and the symbol in which the HE-SIG is located in a packet of the indoor scenario may be shown as format 1 in FIG. 4, including: 16-bit CP+64-bit L-SIG+several (16-bit CP+64-bit HE-SIG), or may be shown as format 2 in FIG. 4, including: 16-bit CP+64-bit L-SIG+several (64-bit CP+256-bit HE-SIG).

Figure 5:
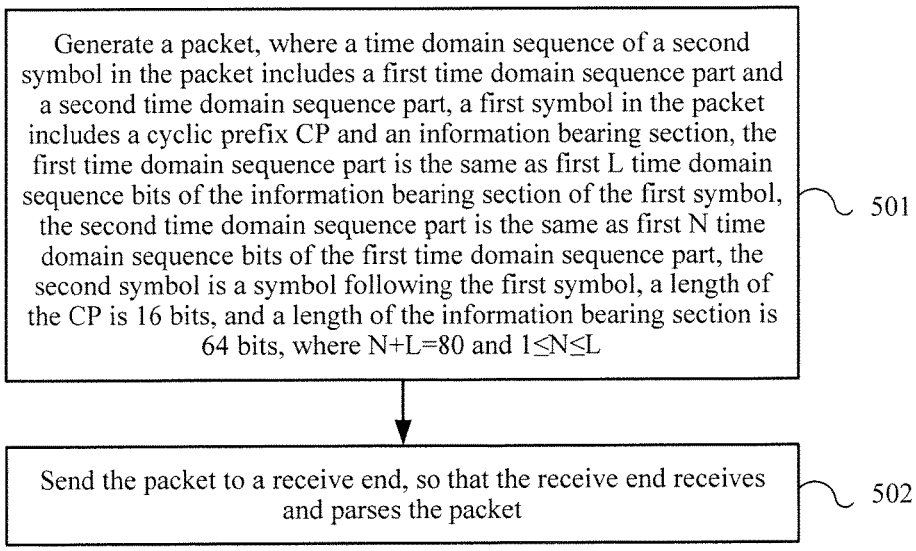
FIG. 5 is a flowchart of another transmission method according to an embodiment of the present invention.

FIG. 5 is a flowchart of another transmission method according to an embodiment of the present invention. The method in FIG. 5 is executed by a wireless local area network transmit end.

501. Generate a packet.

A time domain sequence of a second symbol in the packet includes a first time domain sequence part and a second time domain sequence part, and a first symbol in the packet includes a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, and a length of the CP is 16 bits, a length of the information bearing section is 64 bits, where N+L=80 and $1 \leq N \leq L$.

502. Send the packet to a receive end, so that the receive end receives and parses the packet.

It should be understood that, in this embodiment of the present invention, the receive end refers to a receive end device that is in a same WLAN network as the transmit end, and may be an AP or a STA. When the transmit end is an AP, the receive end is a STA, or when the transmit end is a STA, the receive end is an AP.

In this embodiment of the present invention, a cyclic postfix of an information bearing section of a first symbol and a postfix of the cyclic postfix are added after the first symbol of a packet of an outdoor scenario, which can not only ensure backward compatibility, but also strengthen robustness of packet transmission to an extent by reducing ISI impact.

In addition, according to the method in this embodiment of the present invention, an 11ax receive end (11ax AP or 11ax STA) can further determine, according to an autocorrelation value of specified time domain sequence parts of two symbols that are the first symbol and a symbol following the first symbol, whether the packet is a packet of an outdoor scenario, and then, can parse and read the packet according to packet formats of different scenarios.

It should be understood that, in the present invention, the packet of the outdoor scenario only indicates that the packet is generally used in the outdoor scenario, and does not indicate that the packet of the outdoor scenario can be transmitted only in the outdoor scenario. Similarly, a packet of an indoor scenario only indicates that the packet is generally used in the indoor scenario, and does not indicate that the packet of the indoor scenario can be transmitted only in the indoor scenario. In a practical application, the packet of the indoor scenario, the packet of the outdoor scenario, and even a WLAN packet of a different version may be simultaneously transmitted at a specific place.

Optionally, the first symbol is a symbol in which legacy signaling L-SIG is located. In this embodiment of the present invention, a cyclic postfix for an L-SIG is added after a symbol in which the L-SIG is located in a packet of an outdoor scenario, which can not only ensure backward compatibility for parsing the L-SIG, but also reduce ISI impact, thereby strengthening robustness for the packet to transmit the L-SIG Preferably, a value of L is 16, 24, 36 or 48.

Figure 6:
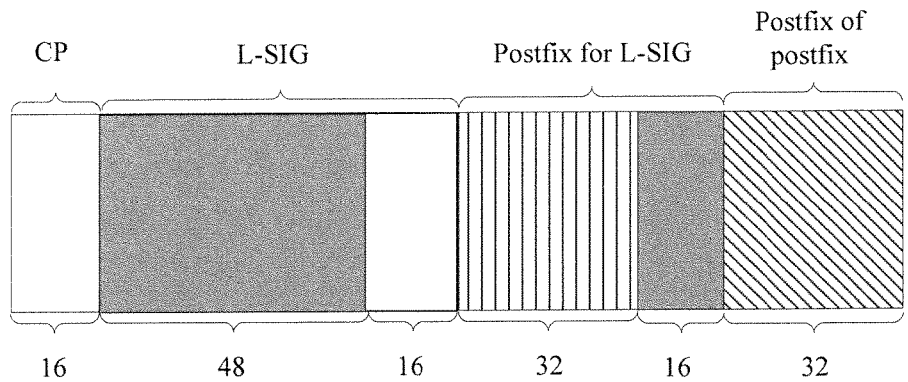
FIG. 6 is a schematic diagram of another format of a symbol in which an L-SIG is located and a symbol in which a postfix for the L-SIG is located according to an embodiment of the present invention.

FIG. 6 is a schematic diagram of another format of a symbol in which an L-SIG is located and a symbol in which a postfix for the L-SIG is located according to an embodiment of the present invention. In this embodiment of the present invention, a manner of a preferred data format of the L-SIG field and the postfix for the L-SIG is shown in FIG. 6, including: a 16-bit CP, a 64-bit L-SIG, a 48-bit postfix for the L-SIG (Postfix for L-SIG), a 32-bit postfix of postfix (Postfix of Postfix). A time domain sequence of the postfix for the L-SIG is the same as first 48 time domain sequence bits of the 64-bit L-SIG, and a time domain sequence of the postfix of postfix is the same as first 32 time domain sequence bits of the postfix for the L-SIG. When a value of a length of a cyclic postfix for the L-SIG is 48, time occupied by the cyclic postfix for the L-SIG is corresponding to a time of 2.4 μs. When a delay spread of a channel is less than 3.2 μs, a 48-point cyclic postfix may meet a requirement of resisting ISI impact.

In addition, in this embodiment of the present invention, a cyclic postfix of a second symbol and a postfix of postfix form a complete symbol, so that a traditional STA performs a more robust automatic detection. The STA may distinguish a version (11a\g\n\ac) of a packet by means of the automatic detection.

Figure 7:
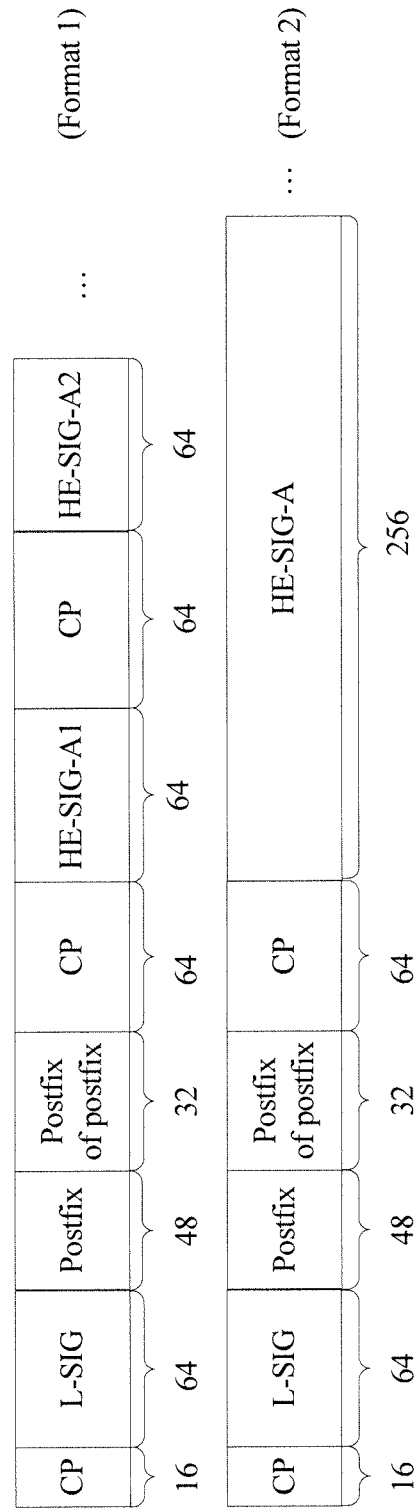
FIG. 7 is a schematic diagram of another format of a symbol in which an L-SIG is located, a symbol in which a postfix for the L-SIG is located, and a symbol in which an HE-SIG is located in an outdoor scenario according to an embodiment of the present invention.

FIG. 7 is a schematic diagram of another format of a symbol in which an L-SIG is located, a symbol in which a postfix for the L-SIG is located, and a symbol in which an HE-SIG is located in an outdoor scenario according to an embodiment of the present invention. In this embodiment of the present invention, a signaling format of the symbol in which the L-SIG is located, the symbol in which the postfix for the L-SIG is located, and the symbol in which the HE-SIG is located in a packet of the outdoor scenario may be shown as format 1 in FIG. 7, including: 16-bit CP+64-bit L-SIG field+48-bit postfix (Postfix) field+32-bit postfix of postfix (Postfix of Postfix) field+several (16-bit CP+64-bit HE-SIG field), or may be shown as format 2 in FIG. 7, including: 16-bit CP+64-bit L-SIG field+48-bit postfix (Postfix) field+32-bit postfix of postfix (Postfix of Postfix) field+several (64-bit CP+256-bit HE-SIG field). It should be understood that, the signaling format in FIG. 7 is only a preferred solution. In a practical application, another signaling format may be used in the method in this embodiment of the present invention, for example, a length of the postfix is 50, a length of the postfix of postfix is 30, or the like.

In addition, a wireless local area network transmit end in this embodiment of the present invention may further send a packet of an indoor scenario. In this case, a signaling format of an L-SIG field and an HE-SIG field in the packet of the indoor scenario may be shown as format 1 or format 2 in FIG. 4.

Figure 8:
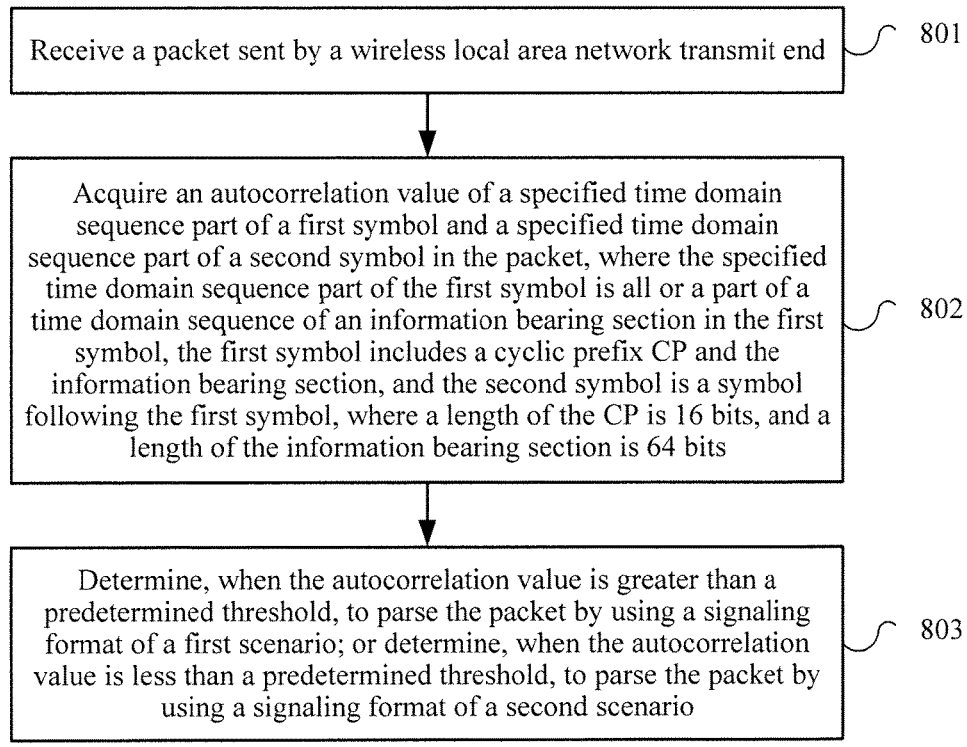
FIG. 8 is a flowchart of another transmission method according to an embodiment of the present invention.

FIG. 8 is a flowchart of another transmission method according to an embodiment of the present invention. The method in FIG. 8 is executed by a wireless local area network receive end. The receive end may be an AP or a STA.

801. Receive a packet sent by a wireless local area network transmit end.

It should be understood that, in this embodiment of the present invention, the transmit end may be an AP or a STA. When the receive end is an AP, the transmit end is a STA, or when the receive end is a STA, the transmit end is an AP.

802. Acquire an autocorrelation value of a specified time domain sequence part of a first symbol and a specified time domain sequence part of a second symbol in the packet.

The specified time domain sequence part of the first symbol is all or a part of a time domain sequence of an information bearing section in the first symbol, the first symbol includes a cyclic prefix CP and the information bearing section, and the second symbol is a symbol following the first symbol, where a length of the CP is 16 bits, and a length of the information bearing section is 64 bits.

803. Determine, when the autocorrelation value is greater than a predetermined threshold, to parse the packet by using a signaling format of a first scenario; or determine, when the autocorrelation value is less than a predetermined threshold, to parse the packet by using a signaling format of a second scenario.

It should be understood that, in this embodiment of the present invention, the first scenario refers to an outdoor scenario of a wireless local area network, and the second scenario refers to an indoor scenario of the wireless local area network. It should be understood that, in the present invention, a packet of the outdoor scenario only indicates that the packet is generally used in the outdoor scenario, and does not indicate that the packet of the outdoor scenario can be transmitted only in the outdoor scenario. Similarly, a packet of the indoor scenario only indicates that the packet is generally used in the indoor scenario, and does not indicate that the packet of the indoor scenario can be transmitted only in the indoor scenario. In a practical application, the packet of the indoor scenario, the packet of the outdoor scenario, and even a WLAN packet of a different version may be simultaneously transmitted at a specific place.

In this embodiment of the present invention, a scenario to which the packet belongs can be determined by comparing the autocorrelation value of the specified time domain sequence part of the first symbol and the specified time domain sequence part of a symbol following the first symbol in the packet, and then the packet can be parsed by using a data format of this scenario.

It should be understood that, in this embodiment of the present invention, when the autocorrelation value is equal to the predetermined threshold, the packet may be parsed according to the signaling format of the first scenario, or the packet is parsed according to the signaling format of the second scenario.

Optionally, in an embodiment, step 802 is specifically implemented as follows: acquiring an autocorrelation value of a first specified time domain sequence part in the first symbol and a second specified time domain sequence part in the second symbol, where the first specified time domain sequence part is the first L time domain sequence bits of the information bearing section of the first symbol, and the second specified time domain sequence part is the first L time domain sequence bits in a time domain sequence of the second symbol, where $1 \leq L \leq 64$.

Further, the acquiring an autocorrelation value of a first specified time domain sequence part in the first symbol and a second specified time domain sequence part in the second symbol is expressed by using the following formula:

$$R_L = \sum_{i=0}^{L-1} r_{i+16} r_{i+80}^*; \quad \text{Formula (1)}$$

or

-continued $$\rho_L = \frac{\sum_{i=0}^{L-1} r_{i+16} r_{i+80}^*}{\sqrt{\sum_{i=0}^{L-1} |r_{i+16}|^2 \sum_{i=0}^{L-1} |r_{i+80}^*|^2}},$$ Formula (2)

where $r_i$ indicates an $(i-80)^{th}$ time domain signal value of the time domain sequence of the second symbol when a subscript i is greater than or equal to 80, or $r_i$ indicates an $i^{th}$ time domain signal value of a time domain sequence of the first symbol when a subscript i is less than 80, $r_i^*$ indicates a conjugate value of $r_i$, $R_L$ indicates an autocorrelation value that is not normalized, $\rho_L$ indicates a normalized autocorrelation value, $r_{16} \ldots r_{L+15}$ indicate time domain signal values of the first specified time domain sequence part, and $r_{80} \ldots r_{L+79}$ indicate time domain signal values of the second specified time domain sequence part.

The autocorrelation value is obtained and then compared with the predetermined threshold, and a signaling format used by the packet may be determined, thereby parsing the packet.

Specifically, in this embodiment, step 803 is specifically implemented as follows: when the autocorrelation value is greater than the predetermined threshold, determining content of the information bearing section of the first symbol according to last (64−L) time domain sequence bits of the information bearing section of the first symbol and the first L time domain sequence bits in the time domain sequence of the second symbol. According to the method in this embodiment of the present invention, robustness of packet transmission can be strengthened to an extent by reducing ISI impact.

Figure 9:
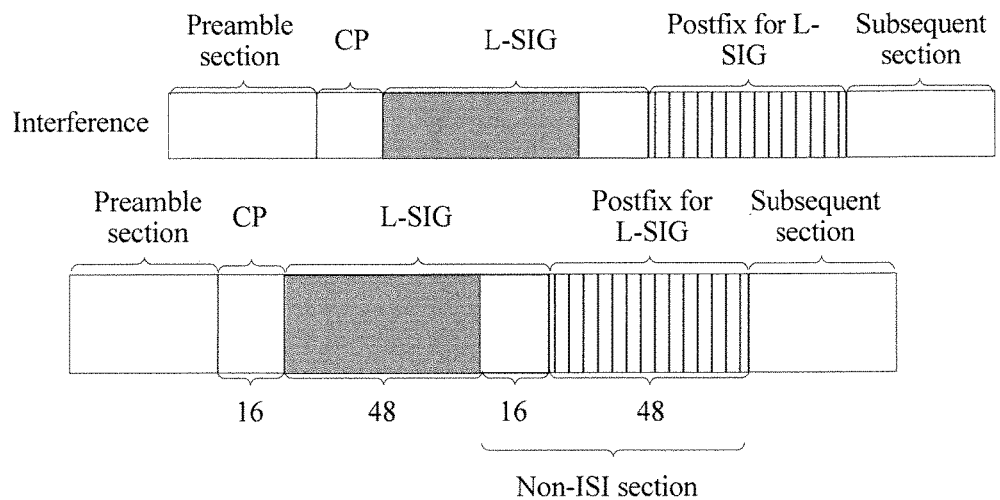
FIG. 9 is a schematic diagram of a method for dynamically adjusting a pilot pattern according to a sparse channel according to an embodiment of the present invention.

FIG. 9 is a schematic diagram of a method for dynamically adjusting a pilot pattern according to a sparse channel according to an embodiment of the present invention. As shown in the figure, a non-ISI section may reduce ISI impact. In this case, a receive end may read the non-ISI section shown in FIG. 9, to reduce the ISI impact and strengthen robustness of L-SIG signaling. Because a postfix section (a shaded section with vertical bars) should be in front of a section (white) in which the L-SIG is not copied, when content of the non-ISI section is being read, correction and compensation need to be performed in advance. The postfix section is equal to a length (64 points, 3.2 μs) of one delayed symbol section. Therefore, reading may be directly performed by compensating a phase difference caused by a 3.2 μs delay, or content of the postfix section may be first moved ahead of content of the white section, and then the content of the non-ISI section is read.

Specifically, it is assumed that a signaling format of a symbol in which an L-SIG is located and a symbol in which an HE-SIG is located in a packet that is of an indoor scenario and is sent by a transmit end is shown as FIG. 4, and a signaling format of a symbol in which an L-SIG is located, a symbol in which a postfix for the L-SIG is located, and a symbol in which an HE-SIG is located in a packet of an outdoor scenario is shown as FIG. 3. In this case, the receive end may determine, by using an autocorrelation value acquired from the following formula, a signaling format used by a packet:

$$R_{48} = \sum_{i=0}^{47} r_{i+16} r_{i+80}^*;$$ Formula (3)

or $$\rho_{48} = \frac{\sum_{i=0}^{47} r_{i+16} r_{i+80}^*}{\sqrt{\sum_{i=0}^{47} |r_{i+16}|^2 \sum_{i=0}^{47} |r_{i+80}^*|^2}}.$$ Formula (4)

Figure 10:
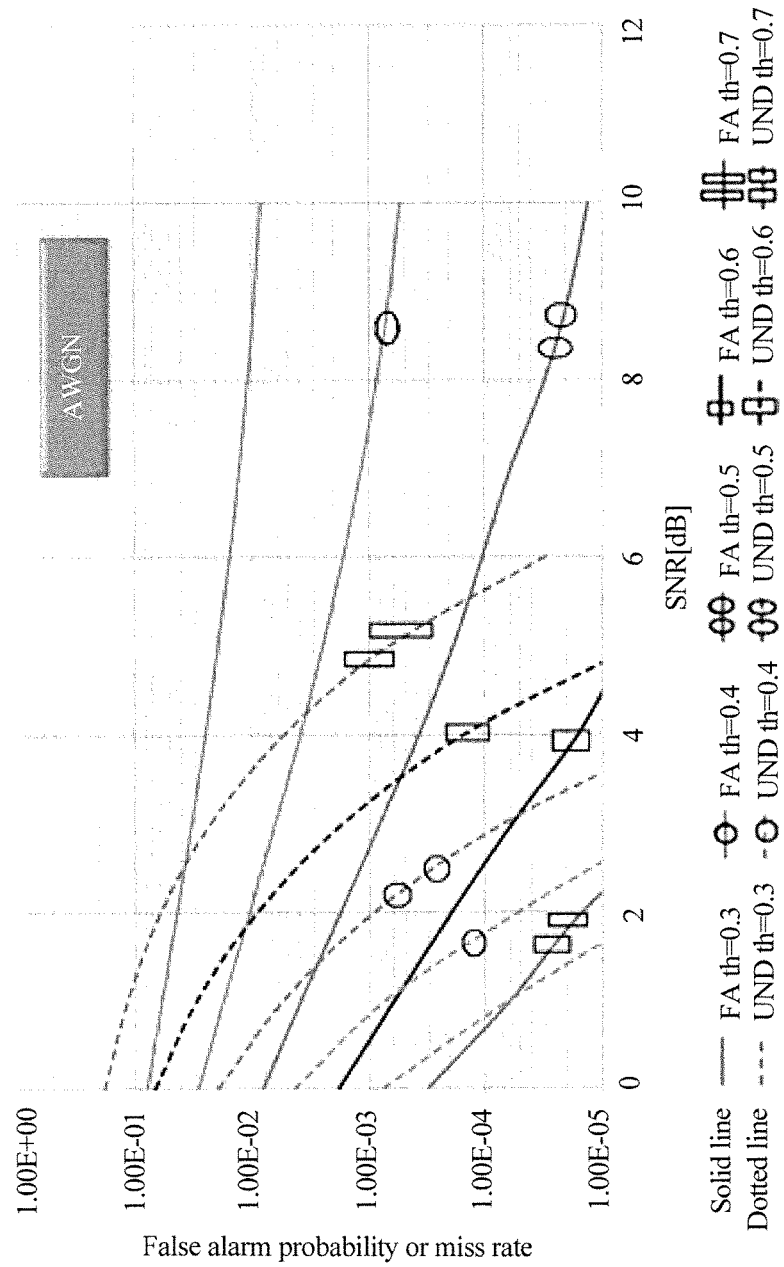
FIG. 10 is a diagram of a functional relationship between either of a packet error rate and a miss rate that are each of multiple predetermined thresholds and a signal-to-noise ratio on an AWGN channel according to an embodiment of the present invention.
Figure 11:
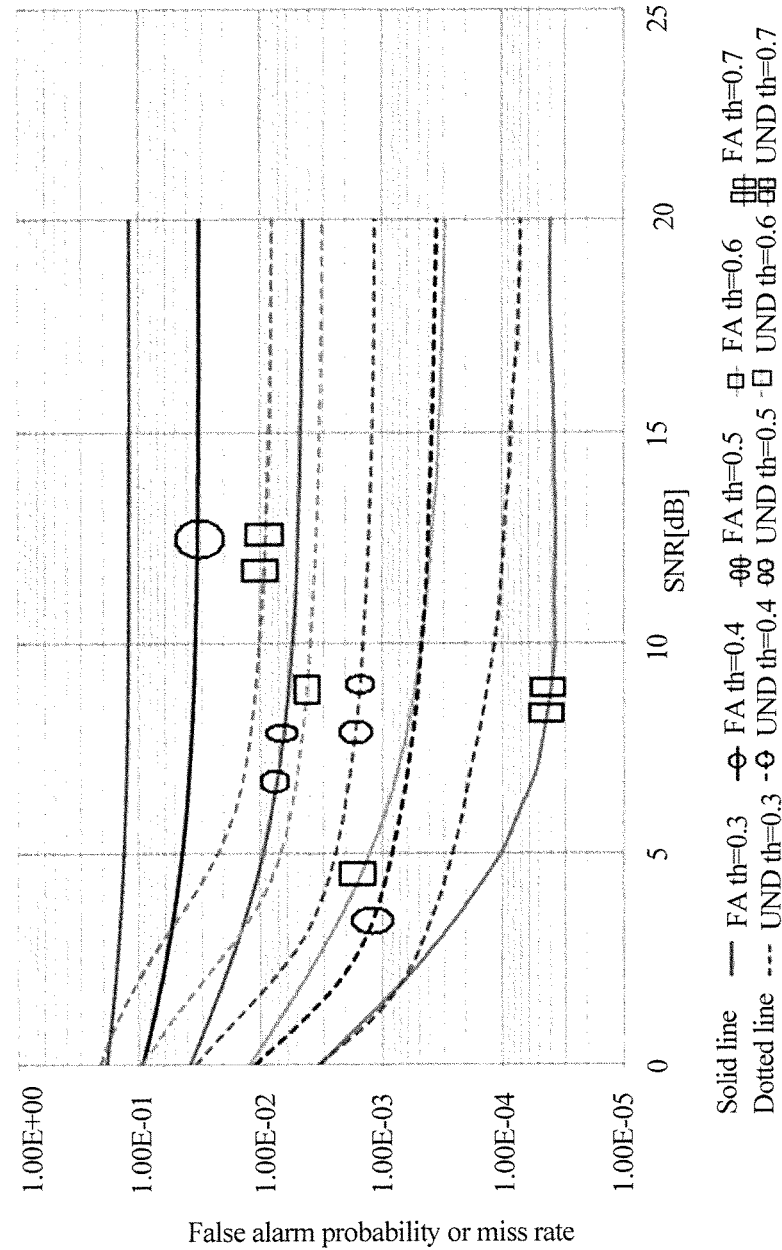
FIG. 11 is a diagram of a functional relationship between either of a false alarm probability and a miss rate that are each of multiple predetermined thresholds and a signal-to-noise ratio on a UMi NLOS channel according to an embodiment of the present invention.

Using the foregoing autocorrelation method may identify a packet of an indoor scenario and a packet of an outdoor scenario in a relatively accurate manner. In this embodiment of the present invention, when L=48, an identification simulation effect of the postfix for the L-SIG is shown in FIG. 10 and FIG. 11. FIG. 10 is a diagram of a functional relationship between either of a packet error rate and a miss rate that are each of multiple predetermined thresholds and a signal-to-noise ratio on an AWGN channel according to an embodiment of the present invention. FIG. 11 is a diagram of a functional relationship between either of a false alarm probability and a miss rate that are each of multiple predetermined thresholds and a signal-to-noise ratio on a UMi NLOS channel according to an embodiment of the present invention. In the figures, the indicates a predetermined threshold that is a normalized autocorrelation value, FA indicates a false alarm probability, and und indicates a miss rate. It may be learned from FIG. 10 and FIG. 11 that, when the predetermined threshold increases, the false alarm probability decreases, and the miss rate increases. Therefore, setting of a threshold needs to be considered in a balanced way, and neither a larger threshold nor a smaller threshold brings better effect.

Figure 12:
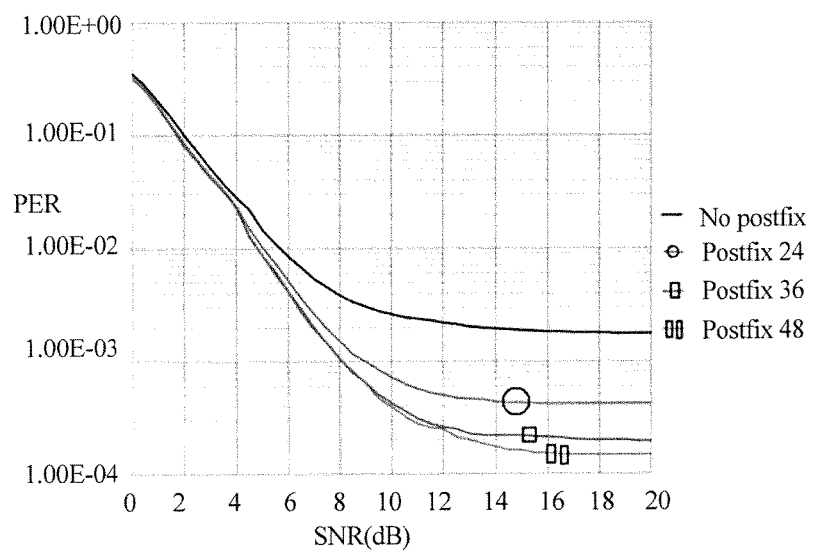
FIG. 12 is evaluation performance of an L-SIG without a postfix and an L-SIG with a postfix on a UMi NLOS channel.

FIG. 12 is evaluation performance of an L-SIG without a postfix and an L-SIG with a postfix on a UMi NLOS channel. A postfix for the L-SIG is separately 0, 24, 48, or 64.

Figure 13:
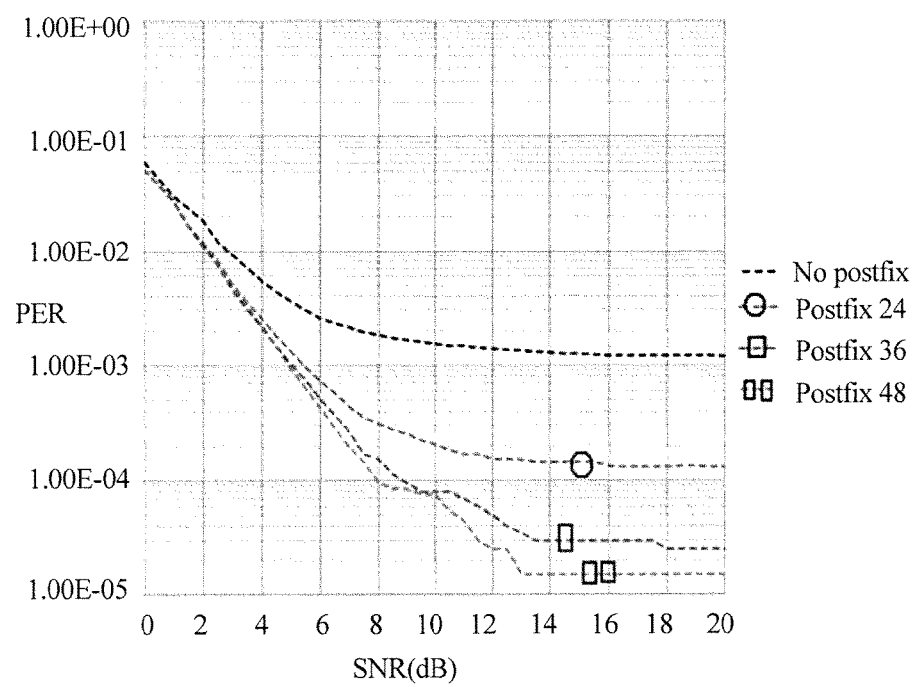
FIG. 13 is performance of an L-SIG without a postfix and an L-SIG with a postfix in an ideal channel estimation case.

FIG. 13 is performance of an L-SIG without a postfix and an L-SIG with a postfix in an ideal channel estimation case, that is, during channel estimation, a noise 0 is assumed. A postfix for the L-SIG is separately 0, 24, 48, or 64.

It may be learned from FIG. 12 and FIG. 13 that a larger postfix indicates a smaller packet error rate (PER), which is more obvious with an increase in the SNR (signal-to-noise ratio).

Optionally, in another embodiment, step 802 is specifically implemented as follows: acquiring an autocorrelation value of a first specified time domain sequence part in the first symbol and a second specified time domain sequence part and a third specified time domain sequence part that are in the second symbol, where the first specified time domain sequence part is first L time domain sequence bits of the information bearing section of the first symbol, the second specified part is first L time domain sequence bits of the second symbol, and the third specified part is last L time domain sequence bits of the second symbol, where $16 \leq L \leq 40$.

Further, the acquiring an autocorrelation value of a first specified part in the first symbol and a second specified part in the second symbol is expressed by using the following formula:

$$R_L = \sum_{i=0}^{L-1} r_{i+16} r^*_{i+80} r_{i+160-L} r^*_{i+160-L};\quad\text{Formula (5)}$$

or $$\rho_L = \frac{\sum_{i=0}^{L-1} r_{i+16} r^*_{i+80} r_{i+160-L} r^*_{i+160-L}}{\sqrt{\sum_{i=0}^{L-1}|r_{i+16}|^2 \sum_{i=0}^{L-1}|r^*_{i+80}|^2 \sum_{i=0}^{L-1}|r_{i+160-L}|^2 \sum_{i=0}^{L-1}|r^*_{i+160-L}|^2}},\quad\text{Formula (6)}$$

where $r_i$ indicates an $(i-80)^{th}$ time domain signal value of a time domain sequence of the second symbol when a subscript i is greater than or equal to 80, or $r_i$ indicates an $i^{th}$ time domain signal value of a time domain sequence of the first symbol when a subscript i is less than 80, $r^*_i$ indicates a conjugate value of $r_i$, $R_L$ indicates an autocorrelation value that is not normalized, $\rho_L$ indicates a normalized autocorrelation value, $r_{16} \ldots r_{L+15}$ indicate time domain signal values of the first specified time domain sequence part, $r_{80} \ldots r_{L+79}$ indicate time domain signal values of the second specified time domain sequence part, and $r_{160-L} \ldots r_{159}$ indicate time domain signal values of the third specified time domain sequence part.

Alternatively, further, the acquiring an autocorrelation value of a first specified time domain sequence part in the first symbol and a second specified time domain sequence part and a third specified time domain sequence part that are in the second symbol is expressed by using the following formula:

$$R_L = \sum_{i=0}^{L-1} r_{i+16} r^*_{i+80} + r_{i+80} r^*_{i+160-L};\quad\text{Formula (7)}$$

or $$\rho_L = \left( \frac{\sum_{i=0}^{L-1} r_{i+16} r^*_{i+80}}{\sqrt{\sum_{i=0}^{L-1}|r_{i+16}|^2 \sum_{i=0}^{L-1}|r^*_{i+80}|^2}} + \frac{\sum_{i=0}^{L-1} r_{80} r^*_{i+160-L}}{\sqrt{\sum_{i=0}^{L-1}|r_{i+80}|^2 \sum_{i=0}^{L-1}|r^*_{i+160-L}|^2}} \right) / 2,\quad\text{Formula (8)}$$

where $r_i$ indicates an $(i-80)^{th}$ time domain signal value of a time domain sequence of the second symbol when a subscript i is greater than or equal to 80, or $r_i$ indicates an $i^{th}$ time domain signal value of a time domain sequence of the first symbol when a subscript i is less than 80, $r^*_i$ indicates a conjugate value of $r_i$, $R_L$ indicates an autocorrelation value that is not normalized, $\rho_L$ indicates a normalized autocorrelation value, $r_{16} \ldots r_{L+15}$ indicate time domain signal values of the first specified time domain sequence part, $r_{80} \ldots r_{L+79}$ indicate time domain signal values of the second specified time domain sequence part, and $r_{160-L} \ldots r_{159}$ indicate time domain signal values of the third specified time domain sequence part.

Specifically, in this embodiment, step 803 is specifically implemented as follows: when the autocorrelation value is greater than the predetermined threshold, determining content of the information bearing section of the first symbol according to last (L−16) time domain sequence bits of the information bearing section of the first symbol and first (80−L) time domain sequence bits in the time domain sequence of the second symbol.

Figure 14:
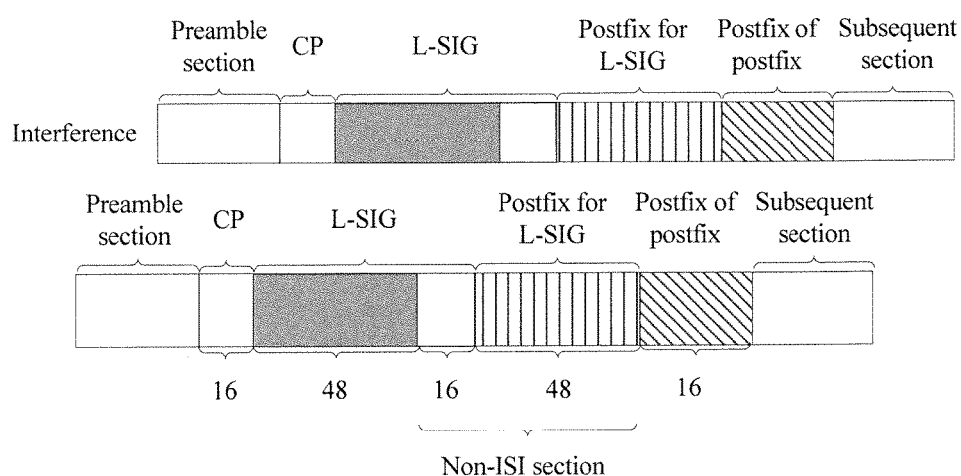
FIG. 14 is a schematic diagram of a method for dynamically adjusting a pilot pattern according to a sparse channel according to an embodiment of the present invention.

FIG. 14 is a schematic diagram of a method for dynamically adjusting a pilot pattern according to a sparse channel according to an embodiment of the present invention. As shown in FIG. 14, a non-ISI section may reduce ISI impact. In this case, a receive end may read the non-ISI section shown in FIG. 14, to reduce the ISI impact and strengthen robustness of L-SIG signaling. This reading method is similar to the method for reading the non-ISI section in FIG. 9, which is not described in this embodiment of the present invention.

Figure 15:
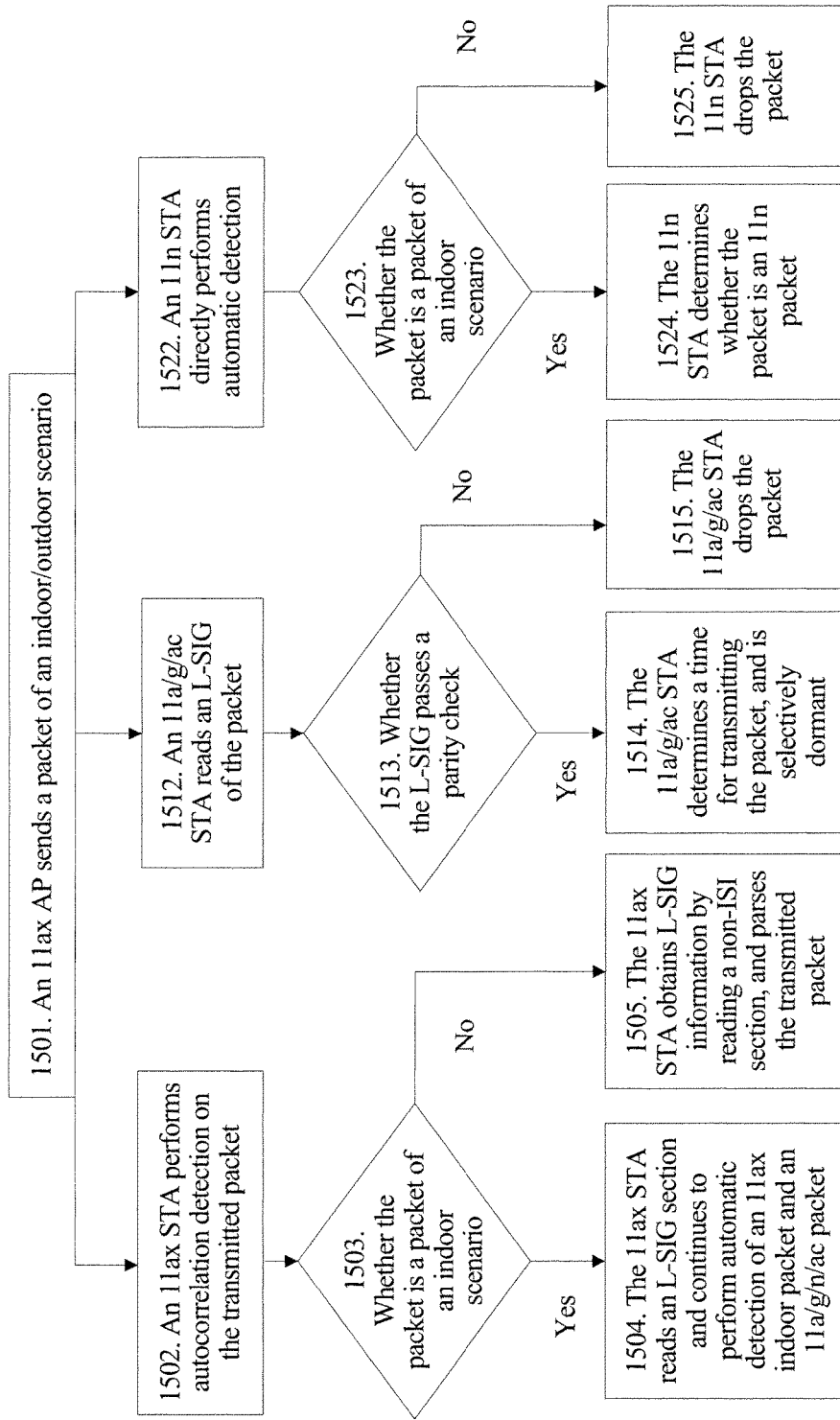
FIG. 15 is a schematic flowchart of wireless local area network packet transmission according to an embodiment of the present invention.

In a practical application, receive end devices with multiple standards may simultaneously exist in a wireless local area network, for example, an 802.11ax STA (11ax STA for short), an 802.11a\g\ac STA (11a\g\ac STA for short), an 802.11n STA (11n STA for short), and the like. FIG. 15 is a schematic flowchart of wireless local area network packet transmission according to an embodiment of the present invention. A specific application scenario of this embodiment of the present invention is shown in FIG. 15. In a packet of an outdoor scenario, a cyclic postfix for an L-SIG is added to a symbol following a symbol in which the L-SIG is located.

1501. An 11ax AP sends a packet of an indoor/outdoor scenario.

It should be understood that, the 11ax AP may send a packet of an 802.11ax format. The packet may be a packet of an indoor scenario, and a signaling format of an L-SIG and an HE-SIG in the packet may be shown as format 1 or format 2 in FIG. 4. Alternatively, the packet may be a packet of an outdoor scenario, and a signaling format of an L-SIG and an HE-SIG in the packet may be shown as format 1 or format 2 in FIG. 3 or FIG. 7. Certainly, another data format may be used, which is not limited in this embodiment of the present invention.

In this case, if a receive end is an 11ax STA, step 1502 is performed. If the receive end is an 11a\g\ac STA, step 1512 is performed. If the received end is an 11n STA, step 1522 is performed.

1502. An 11ax STA performs autocorrelation detection on the transmitted packet.

The 11ax STA performs the autocorrelation detection on the transmitted packet, and determines, according to a detection result, whether the transmitted packet is a packet structure in the indoor scenario or a packet structure in the outdoor scenario.

When a packet format sent by the 11ax AP is format 1 in FIG. 3 or format 1 in FIG. 4, the 11ax STA may perform the autocorrelation detection by using the foregoing Formula (1) or Formula (2).

When the packet format sent by the 11ax AP is format 2 in FIG. 3 or format 2 in FIG. 4, the 11ax STA may perform the autocorrelation detection by using the foregoing Formula (5), Formula (6), Formula (7), or Formula (8).

Certainly, the 11ax STA may perform the autocorrelation detection by using another similar formula, which is not limited in this embodiment of the present invention.

1503. Whether the packet is a packet of an indoor scenario.

Whether the packet is the packet of the indoor scenario may be determined by comparing an autocorrelation detection result and a predetermined threshold.

If the autocorrelation detection result is greater than the predetermined threshold, it may be determined that the packet is not the packet of the indoor scenario (or, the packet is a packet of an outdoor scenario), and step 1504 is performed.

If the autocorrelation detection result is less than the predetermined threshold, it may be determined that the packet is the packet of the indoor scenario, and step 1505 is performed.

When the autocorrelation detection result is a critical value (the predetermined threshold), step 1504 may be performed or step 1505 may be performed.

1504. The 11ax STA reads an L-SIG section and continues to perform automatic detection of an 11ax indoor packet and an 11a/g/n/ac packet.

After determining that the packet is the packet of the indoor scenario, the 11ax STA may further determine, by means of automatic detection of the packet, a version (11a/g/n/ac, or the like) to which the packet belongs.

In this case, a process in which the 11ax STA receives the packet of the indoor scenario ends.

1505. The 11ax STA obtains L-SIG information by reading a non-ISI section, and parses the transmitted packet.

After determining that the packet is the packet of the outdoor scenario, the 11ax STA may obtain the L-SIG information by reading the non-ISI section according to an agreed packet format of an outdoor scenario, and parse the transmitted packet.

For a method for reading the L-SIG by the 11ax STA, reference may be made to a method for acquiring the content of the information bearing section in the first symbol by the receive end in the foregoing embodiment, which is not described in this embodiment of the present invention.

In addition, the 11ax STA may selectively continue to perform automatic detection of an 11ax outdoor packet and the 11a/g/n/ac packet.

In this case, a process in which the 11ax STA receives the packet of the outdoor scenario ends.

1512. An 11a/g/ac STA reads an L-SIG of the packet.

The 11a/g/ac STA reads the packet to acquire the L-SIG information in the packet.

1513. Whether the L-SIG passes a parity check.

If the L-SIG of the packet passes the parity check, step 1514 is performed; otherwise, step 1515 is performed.

1514. The 11a/g/ac STA determines a time for transmitting the packet, and is selectively dormant.

If the L-SIG of the packet passes the parity check, it indicates that a version of the packet is a version supported by the 11a/g/ac STA. In this case, the 11a/g/ac STA may determine the time for transmitting the packet, and then, is selectively dormant.

In this case, a process in which the 11a/g/ac STA receives the packet ends.

1515. The 11a/g/ac STA drops the packet.

If the L-SIG of the packet does not pass the parity check, it indicates that a version of the packet is not a version supported by the 11a/g/ac STA, and the 11a/g/ac STA may drop the packet.

In this case, a process in which the 11a/g/ac STA receives the packet ends.

1522. An 11n STA directly performs automatic detection.

The 11n STA performs the automatic detection on the packet to determine whether the packet is a packet of an indoor scenario.

1523. Whether the packet is a packet of an indoor scenario.

If an automatic detection result indicates that the packet is the packet of the indoor scenario, step 1524 is performed; otherwise, step 1525 is performed.

1524. The 11n STA determines whether the packet is an 11n packet.

After determining that the packet is the packet of the indoor scenario, the 11n STA may further determine whether the packet is an 11n version packet of an indoor scenario.

If the packet is the 11n version packet of the indoor scenario, the 11n STA parses the packet; otherwise, the 11n STA drops the packet.

In this case, a process in which the 11n STA receives the packet ends.

1525. The 11n STA drops the packet.

After determining that the packet is not the packet of the indoor scenario, the 11n STA assumes that the packet is a packet of an 11a/g format, and then when an error occurs on a cyclic redundancy check (CRC), drops the whole packet.

In addition, if an error occurs in an automatic detection process of the 11n STA, the 11n STA directly drops the whole packet.

In this case, a process in which the 11n STA receives the packet ends.

It should be understood that, in this embodiment of the present invention, the 11ax AP sends the packet, and STAs of various versions receive the packet. However, in a practical application, the 11ax STA may send a packet, and APs of various versions receive the packet.

It may be learned from this embodiment of the present invention that, a cyclic postfix for an L-SIG is added after a symbol following a symbol in which the L-SIG is located in a packet of an outdoor scenario, so that a WLAN system can not only ensure backward compatibility, but also strengthen robustness of packet transmission to an extent by reducing ISI impact.

Figure 16:
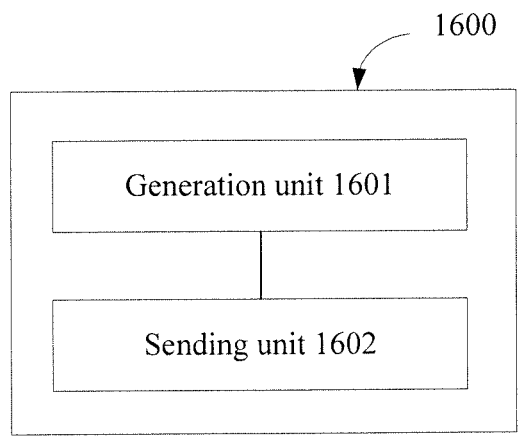
FIG. 16 is a schematic structural diagram of a WLAN transmission device according to an embodiment of the present invention.

FIG. 16 is a schematic structural diagram of a WLAN transmission device 1600 according to an embodiment of the present invention. In a specific application, the WLAN transmission device 1600 may be an AP or a STA. The WLAN transmission device 1600 may include a generation unit 1601 and a sending unit 1602.

The generation unit 1601 is configured to generate a packet.

First L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$.

The sending unit 1602 is configured to send the packet to a receive end, so that the receive end receives and parses the packet.

In this embodiment of the present invention, when transmitting the packet, the WLAN transmission device 1600 adds a cyclic postfix of the information bearing section of the first symbol after the first symbol of the packet of an outdoor scenario, which can not only ensure backward compatibility, but also strengthen robustness of packet transmission to an extent by reducing ISI impact.

In addition, the WLAN transmission device 1600 may further execute the method in FIG. 1, and implement methods of a wireless local area network transmit end device in embodiments shown in FIG. 1 and FIG. 15, which is not described in this embodiment of the present invention.

Figure 17:
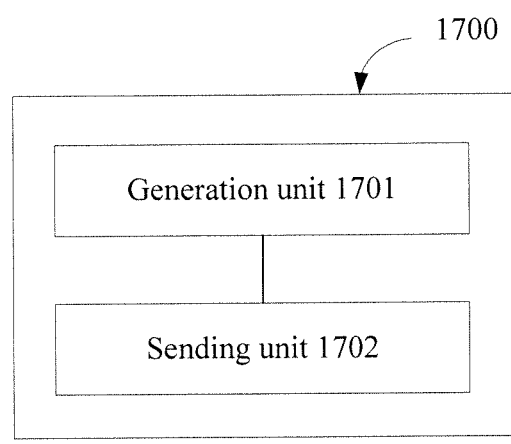
FIG. 17 is a schematic structural diagram of another WLAN transmission device according to an embodiment of the present invention.

FIG. 17 is a schematic structural diagram of a WLAN transmission device 1700 according to an embodiment of the present invention. In a specific application, the WLAN transmission device 1700 may be an AP or a STA. The WLAN transmission device 1700 may include a generation unit 1701 and a sending unit 1702.

The generation unit 1701 is configured to generate a packet.

A time domain sequence of a second symbol in the packet includes a first time domain sequence part and a second time domain sequence part, a first symbol in the packet includes a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, where N+L=80 and 1≤N≤L.

The sending unit 1702 is configured to send the packet to a receive end, so that the receive end receives and parses the packet.

In this embodiment of the present invention, when transmitting the packet, the WLAN transmission device 1700 adds a cyclic postfix of the information bearing section of the first symbol after the first symbol of the packet of an outdoor scenario, which can not only ensure backward compatibility, but also strengthen robustness of packet transmission to an extent by reducing ISI impact.

In addition, the WLAN transmission device 1700 may further execute the method in FIG. 5, and implement methods of a wireless local area network transmit end device in embodiments shown in FIG. 5 and FIG. 15, which is not described in this embodiment of the present invention.

Figure 18:
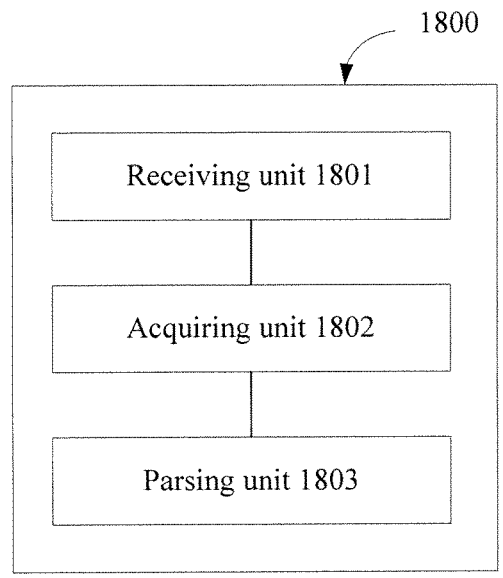
FIG. 18 is a schematic structural diagram of still another WLAN transmission device according to an embodiment of the present invention.

FIG. 18 is a schematic structural diagram of a WLAN transmission device 1800 according to an embodiment of the present invention. In a specific application, the WLAN transmission device 1800 may be an AP or a STA. The WLAN transmission device 1800 may include a receiving unit 1801, an acquiring unit 1802, and a parsing unit 1803.

The receiving unit 1801 is configured to receive a packet sent by a wireless local area network transmit end.

The acquiring unit 1802 is configured to acquire an autocorrelation value of a specified time domain sequence part of a first symbol and a specified time domain sequence part of a second symbol in the packet.

The specified time domain sequence part of the first symbol is all or a part of a time domain sequence of an information bearing section in the first symbol, the first symbol includes a cyclic prefix CP and the information bearing section, and the second symbol is a symbol following the first symbol, where a length of the CP is 16 bits, and a length of the information bearing section is 64 bits.

The parsing unit 1803 is configured to determine, when the autocorrelation value is greater than a predetermined threshold, to parse the packet by using a signaling format of a first scenario; or determine, when the autocorrelation value is less than a predetermined threshold, to parse the packet by using a signaling format of a second scenario.

In this embodiment of the present invention, the WLAN transmission device 1800 can determine, by comparing the autocorrelation value of the specified time domain sequence part of the first symbol and the specified time domain sequence part of a symbol following the first symbol in the packet, a scenario to which the packet belongs, and parse the packet by using a data format of this scenario.

Optionally, in an embodiment, the acquiring unit 1802 is specifically configured to acquire an autocorrelation value of a first specified time domain sequence part in the first symbol and a second specified time domain sequence part in the second symbol, where the first specified time domain sequence part is first L time domain sequence bits of the information bearing section of the first symbol, and the second specified time domain sequence part is first L time domain sequence bits in a time domain sequence of the second symbol, where 1≤L≤64.

Further, in this embodiment, in a process of parsing the packet by using the signaling format of the first scenario, the parsing unit 1803 is specifically configured to determine content of the information bearing section of the first symbol according to last (64−L) time domain sequence bits of the information bearing section of the first symbol and the first L time domain sequence bits in the time domain sequence of the second symbol.

Optionally, in another embodiment, the acquiring unit 1802 is specifically configured to acquire an autocorrelation value of a first specified time domain sequence part in the first symbol and a second specified time domain sequence part and a third specified time domain sequence part that are in the second symbol, where the first specified time domain sequence part is first L time domain sequence bits of the information bearing section of the first symbol, the second specified part is first L time domain sequence bits of the second symbol, and the third specified part is last L time domain sequence bits of the second symbol, where 16≤L≤40.

Further, in this embodiment, in a process of parsing the packet by using the signaling format of the first scenario, the parsing unit 1803 is specifically configured to determine the content of the information bearing section of the first symbol according to last (L−16) time domain sequence bits of the information bearing section of the first symbol and first (80−L) time domain sequence bits in the time domain sequence of the second symbol.

In addition, the WLAN transmission device 1800 may further execute the method in FIG. 8, and implement methods of a wireless local area network receive end device in embodiments shown in FIG. 8 and FIG. 15, which is not described in this embodiment of the present invention.

Figure 19:
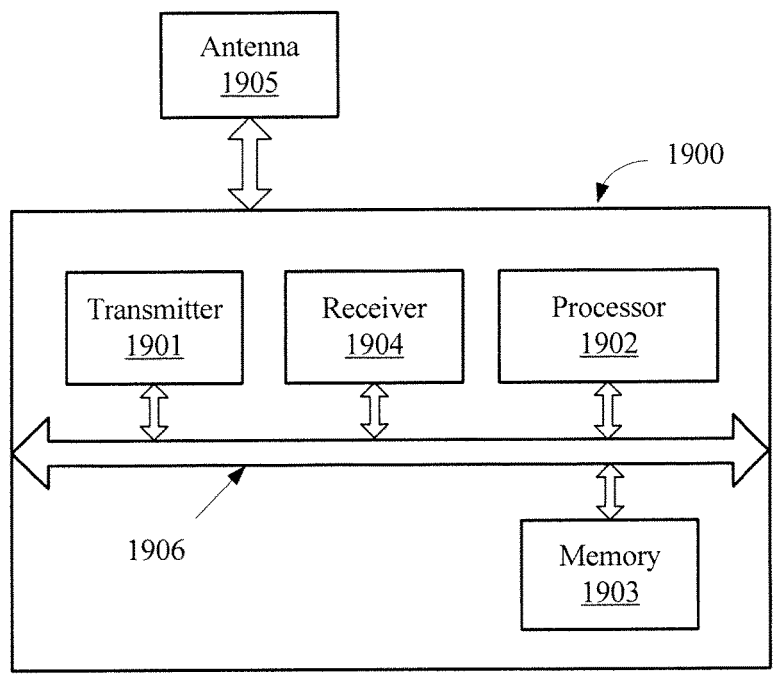
FIG. 19 is a schematic structural diagram of still another WLAN transmission device according to an embodiment of the present invention.

FIG. 19 is a schematic structural diagram of a WLAN transmission device 1900 according to an embodiment of the present invention. In a specific application, the WLAN transmission device 1900 may be an AP or a STA. The WLAN transmission device 1900 may include a processor 1902, a memory 1903, a transmitter 1901, and a receiver 1903.

The receiver 1904, the transmitter 1901, the processor 1902, and the memory 1903 are connected to each other by using a system of a bus 1906. The bus 1906 may be an ISA bus, a PCI bus, an EISA bus, or the like. The bus may be classified into an address bus, a data bus, a control bus, and the like. For convenience of representation, only one double-headed arrow is used in FIG. 19 for representation, which, however, does not mean that there is only one bus or one type of bus. In a specific application, the transmitter 1901 and the receiver 1904 may be coupled to an antenna 1905.

The memory 1903 is configured to store a program. Specifically, the program may include program code, and the program code includes a computer operation instruction. The memory 1903 may include a read-only memory and a random access memory, and provide an instruction and data for the processor 1902. The memory 1903 may include a high-speed RAM memory, and may further include a non-volatile memory (non-volatile memory), for example, at least one disk memory.

The processor 1902 executes the program stored in the memory 1903, and is specifically configured to execute the following operations:

generating a packet, where first L time domain sequence bits of a second symbol in the packet are the same as first L time domain sequence bits of an information bearing section in a time domain sequence of a first symbol in the packet, the first symbol includes a cyclic prefix CP and the information bearing section, the second symbol is a symbol following the first symbol, a length of the CP is 16 bits, and a length of the information bearing section is 64 bits, where $1 \leq L \leq 64$; and sending the packet to a receive end, so that the receive end receives and parses the packet.

The foregoing method that is disclosed in any embodiment in FIG. 1 or FIG. 15 of the present invention and is executed by a transmit end may be applied to the processor 1902, or implemented by the processor 1902. The processor 1902 may be an integrated circuit chip and have a signal processing capability. In an implementation process, each step in the foregoing method may be completed by using an integrated logic circuit of hardware in the processor 1902 or an instruction in a form of software. The foregoing processor 1902 may be a general purpose processor that includes a central processing unit (Central Processing Unit, CPU for short), a network processor (Network Processor, NP for short), and the like; or may be a digital signal processor (DSP), an application-specific integrated circuit (ASIC), a field programmable gate array (FPGA) or another programmable logic device, a discrete gate or a transistor logic device, or a discrete hardware component, which may implement or execute various methods, steps, and logical block diagrams disclosed in this embodiment of the present invention. The general purpose processor may be a microprocessor, or the processor may be any normal processor. The steps of the method disclosed in the embodiments of the present invention may be executed and completed by a hardware decoding processor, or executed and completed by means of a combination of hardware and a software module in a decoding processor. The software module may be located in a mature storage medium in this field, such as a random access memory, a flash memory, a read-only memory, a programmable read-only memory, an electrically-erasable programmable memory, or a register. The storage medium is located in the memory 1903. The processor 1902 reads information in the memory 1903, and completes the steps of the foregoing method in combination with hardware of the memory 1903.

In this embodiment of the present invention, when transmitting the packet, the WLAN transmission device 1900 adds a cyclic postfix of the information bearing section of the first symbol after the first symbol of the packet of an outdoor scenario, which can not only ensure backward compatibility, but also strengthen robustness of packet transmission to an extent by reducing ISI impact.

In addition, the WLAN transmission device 1900 may further execute the method in FIG. 1, and implement methods of a wireless local area network transmit end device in embodiments shown in FIG. 1 and FIG. 15, which is not described in this embodiment of the present invention.

Figure 20:
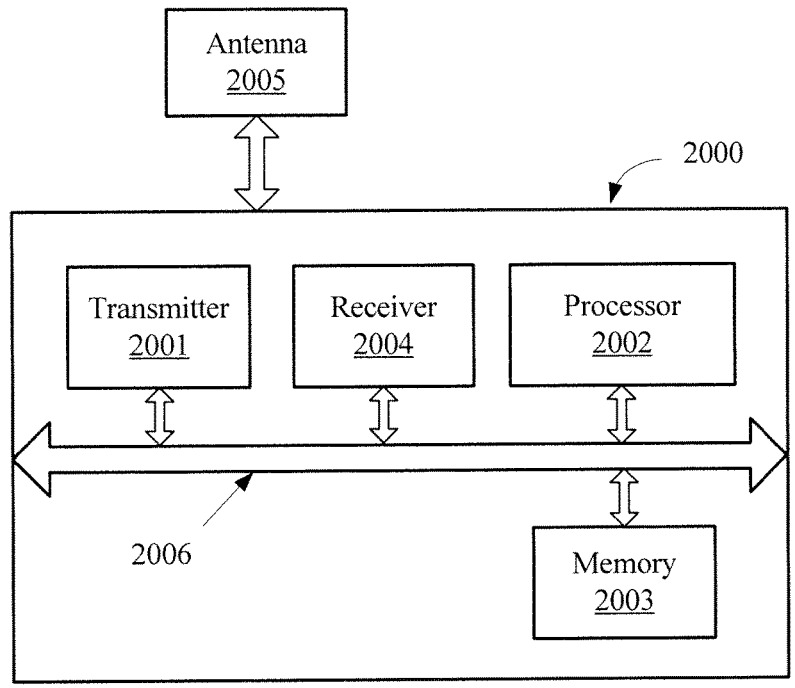
FIG. 20 is a schematic structural diagram of still another WLAN transmission device according to an embodiment of the present invention.

FIG. 20 is a schematic structural diagram of a WLAN transmission device 2000 according to an embodiment of the present invention. The WLAN transmission device 2000 may include a processor 2002, a memory 2003, a transmitter 2001, and a receiver 2003.

The receiver 2004, the transmitter 2001, the processor 2002, and the memory 2003 are connected to each other by using a system of a bus 2006. The bus 2006 may be an ISA bus, a PCI bus, an EISA bus, or the like. The bus may be classified into an address bus, a data bus, a control bus, and the like. For convenience of representation, only one double-headed arrow is used in FIG. 20 for representation, which, however, does not mean that there is only one bus or one type of bus. In a specific application, the transmitter 2001 and the receiver 2004 may be coupled to an antenna 2005.

The memory 2003 is configured to store a program. Specifically, the program may include program code, and the program code includes a computer operation instruction. The memory 2003 may include a read-only memory and a random access memory, and provide an instruction and data for the processor 2002. The memory 2003 may include a high-speed RAM memory, and may further include a non-volatile memory (non-volatile memory), for example, at least one disk memory.

The processor 2002 executes the program stored in the memory 2003, and is specifically configured to execute the following operations:

generating a packet, where a time domain sequence of a second symbol in the packet includes a first time domain sequence part and a second time domain sequence part, a first symbol in the packet includes a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, where $N+L=80$ and $1 \leq N \leq L$; and sending the packet to a receive end, so that the receive end receives and parses the packet.

The foregoing method that is disclosed in any embodiment in FIG. 5 or FIG. 15 of the present invention and is executed by a transmit end may be applied to the processor 2002, or implemented by the processor 2002. The processor 2002 may be an integrated circuit chip and have a signal processing capability. In an implementation process, each step in the foregoing method may be completed by using an integrated logic circuit of hardware in the processor 2002 or an instruction in a form of software. The foregoing processor 2002 may be a general purpose processor that includes a central processing unit (Central Processing Unit, CPU for short), a network processor (Network Processor, NP for short), and the like; or may be a digital signal processor (DSP), an application-specific integrated circuit (ASIC), a field programmable gate array (FPGA) or another programmable logic device, a discrete gate or a transistor logic device, or a discrete hardware component, which may implement or execute various methods, steps, and logical block diagrams disclosed in this embodiment of the present invention. The general purpose processor may be a microprocessor, or the processor may be any normal processor. The steps of the method disclosed in the embodiments of the present invention may be executed and completed by a hardware decoding processor, or executed and completed by means of a combination of hardware and a software module in a decoding processor. The software module may be located in a mature storage medium in this field, such as a random access memory, a flash memory, a read-only memory, a programmable read-only memory, an electrically-erasable programmable memory, or a register. The storage medium is located in the memory 2003. The processor 2002 reads information in the memory 2003, and completes the steps of the foregoing method in combination with hardware of the memory 2003.

In this embodiment of the present invention, when transmitting the packet, the WLAN transmission device 2000 adds a cyclic postfix of the information bearing section of the first symbol after the first symbol of the packet of an outdoor scenario, which can not only ensure backward compatibility, but also strengthen robustness of packet transmission to an extent by reducing ISI impact.

In addition, the WLAN transmission device 2000 may further execute the method in FIG. 5, and implement methods of a wireless local area network transmit end device in embodiments shown in FIG. 5 and FIG. 15, which is not described in this embodiment of the present invention.

Figure 21:
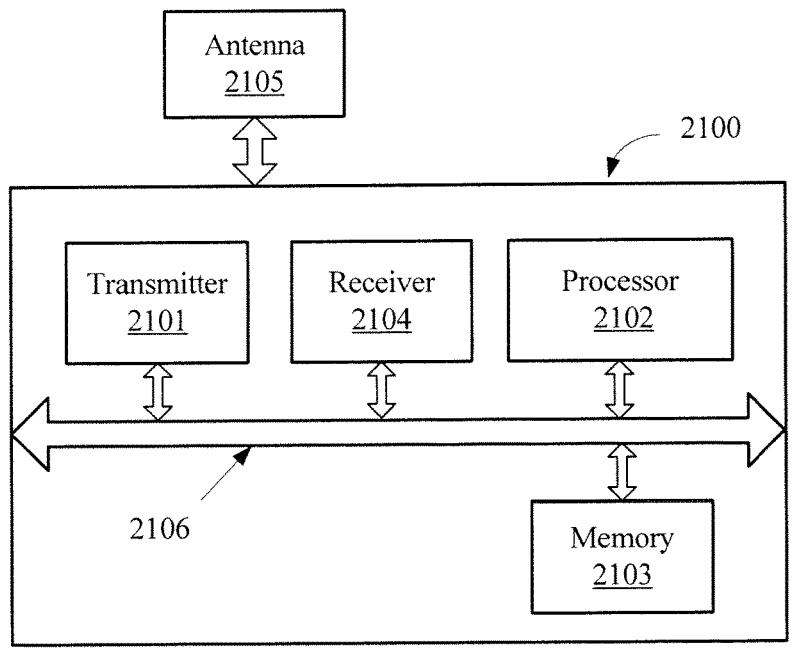
FIG. 21 is a schematic structural diagram of still another WLAN transmission device according to an embodiment of the present invention.

FIG. 21 is a schematic structural diagram of a WLAN transmission device 2100 according to an embodiment of the present invention. In a specific application, the WLAN transmission device 2100 may be an AP or a STA. The WLAN transmission device 2100 may include a processor 2102, a memory 2103, a transmitter 2101, and a receiver 2103.

The receiver 2104, the transmitter 2101, the processor 2102, and the memory 2103 are connected to each other by using a system of a bus 2106. The bus 2106 may be an ISA bus, a PCI bus, an EISA bus, or the like. The bus may be classified into an address bus, a data bus, a control bus, and the like. For convenience of representation, only one double-headed arrow is used in FIG. 21 for representation, which, however, does not mean that there is only one bus or one type of bus. In a specific application, the transmitter 2101 and the receiver 2104 may be coupled to an antenna 2105.

The memory 2103 is configured to store a program. Specifically, the program may include program code, and the program code includes a computer operation instruction. The memory 2103 may include a read-only memory and a random access memory, and provide an instruction and data for the processor 2102. The memory 2103 may include a high-speed RAM memory, and may further include a non-volatile memory, for example, at least one disk memory.

The processor 2102 executes the program stored in the memory 2103, and is specifically configured to execute the following operations:

receiving a packet sent by a wireless local area network transmit end;

acquiring an autocorrelation value of a specified time domain sequence part of a first symbol and a specified time domain sequence part of a second symbol in the packet, where the specified time domain sequence part of the first symbol is all or a part of a time domain sequence of an information bearing section in the first symbol, the first symbol includes a cyclic prefix CP and the information bearing section, and the second symbol is a symbol following the first symbol, where a length of the CP is 16 bits, and a length of the information bearing section is 64 bits; and determining, when the autocorrelation value is greater than a predetermined threshold, to parse the packet by using a signaling format of a first scenario; or determining, when the autocorrelation value is less than a predetermined threshold, to parse the packet by using a signaling format of a second scenario.

The foregoing method that is disclosed in any embodiment in FIG. 8 or FIG. 15 of the present invention and is executed by a receive end may be applied to the processor 2102, or implemented by the processor 2102. The processor 2102 may be an integrated circuit chip and have a signal processing capability. In an implementation process, each step in the foregoing method may be completed by using an integrated logic circuit of hardware in the processor 2102 or an instruction in a form of software. The foregoing processor 2102 may be a general purpose processor that includes a central processing unit (CPU for short), a network processor (NP for short), and the like; or may be a digital signal processor (DSP), an application-specific integrated circuit (ASIC), a field programmable gate array (FPGA) or another programmable logic device, a discrete gate or a transistor logic device, or a discrete hardware component, which may implement or execute various methods, steps, and logical block diagrams disclosed in this embodiment of the present invention. The general purpose processor may be a microprocessor, or the processor may be any normal processor. The steps of the method disclosed in the embodiments of the present invention may be executed and completed by a hardware decoding processor, or executed and completed by means of a combination of hardware and a software module in a decoding processor. The software module may be located in a mature storage medium in this field, such as a random access memory, a flash memory, a read-only memory, a programmable read-only memory, an electrically-erasable programmable memory, or a register. The storage medium is located in the memory 2103. The processor 2102 reads information in the memory 2103, and completes the steps of the foregoing method in combination with hardware of the memory 2013.

In this embodiment of the present invention, the WLAN transmission device 2100 can determine, by comparing the autocorrelation value of the specified time domain sequence part of the first symbol and the specified time domain sequence part of a symbol following the first symbol in the packet, a scenario to which the packet belongs, and parse the packet by using a data format of this scenario.

Optionally, in an embodiment, in a process of acquiring an autocorrelation value of a specified time domain sequence part of a first symbol and a specified time domain sequence part of a second symbol in the packet, the processor 2102 is specifically configured to acquire an autocorrelation value of a first specified time domain sequence part in the first symbol and a second specified time domain sequence part in the second symbol, where the first specified time domain sequence part is first L time domain sequence bits of the information bearing section of the first symbol, and the second specified time domain sequence part is first L time domain sequence bits in a time domain sequence of the second symbol, where $1 \leq L \leq 64$.

Further, in this embodiment, in a process of parsing the packet by using the signaling format of the first scenario, the processor 2102 is specifically configured to determine content of the information bearing section of the first symbol according to last (64−L) time domain sequence bits of the information bearing section of the first symbol and the first L time domain sequence bits in the time domain sequence of the second symbol.

Optionally, in another embodiment, in a process of acquiring an autocorrelation value of a specified time domain sequence part of a first symbol and a specified time domain sequence part of a second symbol in the packet, the processor 2102 is specifically configured to acquire an autocorrelation value of a first specified time domain sequence part in the first symbol and a second specified time domain sequence part and a third specified time domain sequence part that are in the second symbol, where the first specified time domain sequence part is first L time domain sequence bits of the information bearing section of the first symbol, the second specified part is first L time domain sequence bits of the second symbol, and the third specified part is last L time domain sequence bits of the second symbol, where $16 \le L \le 40$.

Further, in this embodiment, in a process of parsing the packet by using the signaling format of the first scenario, the processor 2102 is specifically configured to determine the content of the information bearing section of the first symbol according to last (L−16) time domain sequence bits of the information bearing section of the first symbol and first (80−L) time domain sequence bits in the time domain sequence of the second symbol.

In addition, the WLAN transmission device 2100 may further execute the method in FIG. 8, and implement methods of a wireless local area network receive end device in embodiments shown in FIG. 8 and FIG. 15, which is not described in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A wireless local area network transmission method, wherein the method comprises:
   generating a packet, wherein first L time domain sequence bits of a second symbol in the packet are the same as first L time domain sequence bits of an information bearing section in a time domain sequence of a first symbol in the packet, the first symbol comprises a cyclic prefix, CP, and the information bearing section, the second symbol is a symbol following the first symbol, a length of the CP is 16 bits, and a length of the information bearing section is 64 bits, wherein $1 \le L \le 64$; and
   sending the packet to a receive end, so that the receive end receives and parses the packet.

2. The method according to claim 1, wherein the first symbol is a symbol in which legacy signaling, L-SIG, is located.

3. The method according to claim 1, wherein a value of L is 16, 24, 36 or 48.

4. A wireless local area network transmission method, comprising:
   generating a packet, wherein a time domain sequence of a second symbol in the packet comprises a first time domain sequence part and a second time domain sequence part, a first symbol in the packet comprises a cyclic prefix, CP, and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, wherein N+L=80 and $1 \le N \le L$; and
   sending the packet to a receive end, so that the receive end receives and parses the packet.

5. The method according to claim 4, wherein the first symbol is a symbol in which the L-SIG is located.

6. The method according to claim 4, wherein a value of L is 48, and a value of N is 32.

7. The wireless local area network transmission method according to claim 1, further comprising:
receiving a packet sent by the wireless local area network transmit end;
acquiring an autocorrelation value of a specified time domain sequence part of a first symbol and a specified time domain sequence part of a second symbol in the packet, wherein the specified time domain sequence part of the first symbol is all or a part of a time domain sequence of an information bearing section in the first symbol, the first symbol comprises a cyclic prefix, CP, and the information bearing section, and the second symbol is a symbol following the first symbol, wherein a length of the CP is 16 bits, and a length of the information bearing section is 64 bits; and
determining, when the autocorrelation value is greater than a predetermined threshold, to parse the packet by using a signaling format of a first scenario; or determining, when the autocorrelation value is less than a predetermined threshold, to parse the packet by using a signaling format of a second scenario.

8. The method according to claim 7, wherein the acquiring an autocorrelation value of a specified time domain sequence part of a first symbol and a specified time domain sequence part of a second symbol in the packet comprises:
acquiring an autocorrelation value of a first specified time domain sequence part in the first symbol and a second specified time domain sequence part in the second symbol, wherein the first specified time domain sequence part is first L time domain sequence bits of the information bearing section of the first symbol, and the second specified time domain sequence part is first L time domain sequence bits in a time domain sequence of the second symbol, wherein 1≤L≤64.

9. The method according to claim 8, wherein the acquiring an autocorrelation value of a first specified time domain sequence part in the first symbol and a second specified time domain sequence part in the second symbol is expressed by using the following formula:

$$R_L = \sum_{i=0}^{L-1} r_{i+16} r^*_{i+80};$$

or $$\rho_L = \frac{\sum_{i=0}^{L-1} r_{i+16} r^*_{i+80}}{\sqrt{\sum_{i=0}^{L-1} |r_{i+16}|^2 \sum_{i=0}^{L-1} |r^*_{i+80}|^2}},$$

wherein $r_i$ indicates an $(i-80)^{th}$ time domain signal value of the time domain sequence of the second symbol when a subscript i is greater than or equal to 80, or $r_i$ indicates an $i^{th}$ time domain signal value of a time domain sequence of the first symbol when a subscript i is less than 80, $r^*_i$ indicates a conjugate value of $r_i$, $R_L$ indicates an autocorrelation value that is not normalized, $\rho_L$ indicates a normalized autocorrelation value, $r_{16} \ldots r_{L+15}$ indicate time domain signal values of the first specified time domain sequence part, and $r_{80} \ldots r_{L+79}$ indicate time domain signal values of the second specified time domain sequence part.

10. A wireless local area network transmission device, comprising:
a processor, configured to generate a packet, wherein first L time domain sequence bits of a second symbol in the packet are the same as first L time domain sequence bits of an information bearing section in a time domain sequence of a first symbol in the packet, the first symbol comprises a cyclic prefix CP and the information bearing section, the second symbol is a symbol following the first symbol, a length of the CP is 16 bits, and a length of the information bearing section is 64 bits, wherein 1≤L≤64; and
a transmitter, configured to send the packet to a receive end, so that the receive end receives and parses the packet.

11. A wireless local area network transmission device, comprising:
a processor, configured to generate a packet, wherein a time domain sequence of a second symbol in the packet comprises a first time domain sequence part and a second time domain sequence part, a first symbol in the packet comprises a cyclic prefix CP and an information bearing section, the first time domain sequence part is the same as first L time domain sequence bits of the information bearing section of the first symbol, the second time domain sequence part is the same as first N time domain sequence bits of the first time domain sequence part, the second symbol is a symbol following the first symbol, a length of the CP is 16 bits, and a length of the information bearing section is 64 bits, wherein N+L=80 and 1≤N≤L; and
a transmitter, configured to send the packet to a receive end, so that the receive end receives and parses the packet.

12. A wireless local area network transmission system, comprising:
a processor, configured to generate a packet, wherein first L time domain sequence bits of a second symbol in the packet are the same as first L time domain sequence bits of an information bearing section in a time domain sequence of a first symbol in the packet, the first symbol comprises a cyclic prefix CP and the information bearing section, the second symbol is a symbol following the first symbol, a length of the CP is 16 bits, and a length of the information bearing section is 64 bits, wherein 1≤L≤64;
a transmitter, configured to send the packet to a receive end, so that the receive end receives and parses the packet;
a receiver, configured to receive a packet sent by a wireless local area network transmit end; and
a processor, configured to:
acquire an autocorrelation value of a specified time domain sequence part of a first symbol and a specified time domain sequence part of a second symbol in the packet, wherein the specified time domain sequence part of the first symbol is all or a part of a time domain sequence of an information bearing section in the first symbol, the first symbol comprises a cyclic prefix CP and the information bearing section, and the second symbol is a symbol following the first symbol, wherein a length of the CP is 16 bits, and a length of the information bearing section is 64 bits; and determine, when the autocorrelation value is greater than a predetermined threshold, to parse the packet by using a signaling format of a first scenario; or determine, when the autocorrelation value is less than a predetermined threshold, to parse the packet by using a signaling format of a second scenario.

13. The wireless local area network transmission system according to claim 12, wherein the processor is configured to:

acquire an autocorrelation value of a first specified time domain sequence part in the first symbol and a second specified time domain sequence part in the second symbol, wherein the first specified time domain sequence part is first L time domain sequence bits of the information bearing section of the first symbol, and the second specified time domain sequence part is first L time domain sequence bits in a time domain sequence of the second symbol, wherein 1≤L≤64.

14. The wireless local area network transmission system according to claim 13, wherein in a process of parsing the packet by using the signaling format of the first scenario, the processor is configured to:

determine content of the information bearing section of the first symbol according to last (64−L) time domain sequence bits of the information bearing section of the first symbol and the first L time domain sequence bits in the time domain sequence of the second symbol.

15. The wireless local area network transmission system according to claim 12, wherein the processor is configured to:

acquire an autocorrelation value of a first specified time domain sequence part in the first symbol and a second specified time domain sequence part and a third specified time domain sequence part that are in the second symbol, wherein the first specified time domain sequence part is first L time domain sequence bits of the information bearing section of the first symbol, the second specified part is first L time domain sequence bits of the second symbol, and the third specified part is last L time domain sequence bits of the second symbol, wherein 16≤L≤40.

16. The wireless local area network transmission system according to claim 15, wherein in a process of parsing the packet by using the signaling format of the first scenario, the processor is configured to:

determine content of the information bearing section of the first symbol according to last (L−16) time domain sequence bits of the information bearing section of the first symbol and first (80−L) time domain sequence bits in the time domain sequence of the second symbol.

* * * * *

UNITED STATES PATENT AND TRADEMARK OFFICE
CERTIFICATE OF CORRECTION

PATENT NO. : 10,219,177 B2
APPLICATION NO. : 15/411019
DATED : February 26, 2019
INVENTOR(S) : Guido Montorsi et al.

It is certified that error appears in the above-identified patent and that said Letters Patent is hereby corrected as shown below:

On the Title Page

Page 2, Item (56), Line 18, under OTHER PUBLICATIONS, after "below 6 GHz," delete "IEEE p." and insert --IEEE P-- therefor.

Signed and Sealed this
Twenty-second Day of October, 2019

Andrei Iancu
*Director of the United States Patent and Trademark Office*